(12) United States Patent
Furuta et al.

(10) Patent No.: US 9,646,640 B2
(45) Date of Patent: May 9, 2017

(54) MAGNETIC RECORDING MEDIUM

(71) Applicant: Fuji Electric Co., Ltd., Kawasaki-shi (JP)

(72) Inventors: Akira Furuta, Sendai (JP); Shinji Uchida, Matsumoto (JP); Tomohiro Moriya, Sendai (JP); Hitoshi Nakata, Sendai (JP); Takehito Shimatsu, Sendai (JP)

(73) Assignee: Fuji Electric Co., Ltd., Kawasaki-shi (JP)

(*) Notice: Subject to any disclaimer, the term of this patent is extended or adjusted under 35 U.S.C. 154(b) by 0 days.

(21) Appl. No.: 15/033,951

(22) PCT Filed: Aug. 10, 2015

(86) PCT No.: PCT/JP2015/004019
§ 371 (c)(1),
(2) Date: May 3, 2016

(87) PCT Pub. No.: WO2016/024403
PCT Pub. Date: Feb. 18, 2016

(65) Prior Publication Data
US 2016/0267934 A1    Sep. 15, 2016

(30) Foreign Application Priority Data
Aug. 12, 2014   (JP) .................. 2014-164286

(51) Int. Cl.
*G11B 5/66* (2006.01)
*G11B 5/65* (2006.01)
*G11B 5/73* (2006.01)

(52) U.S. Cl.
CPC ............... *G11B 5/65* (2013.01); *G11B 5/732* (2013.01)

(58) Field of Classification Search
CPC ........ G11B 5/732; G11B 5/7325; G11B 5/738
(Continued)

(56) References Cited

U.S. PATENT DOCUMENTS 6,730,421 B1 * 5/2004 Kirino ............... G11B 5/72
428/336
6,846,583 B2 * 1/2005 Inaba ................ G11B 5/65
428/611

(Continued)

FOREIGN PATENT DOCUMENTS

CN   103098134 A   5/2013
JP   2001-134930 A   5/2001
(Continued)

OTHER PUBLICATIONS

R. F. Penoyer, "Automatic Torque Balance for Magnetic Anisotropy Measurements," The Review of Scientific Instruments, Aug. 1959, vol. 30, No. 8, pp. 711-714.

(Continued)

*Primary Examiner* — Holly Rickman
(74) *Attorney, Agent, or Firm* — Venable LLP; Michael A. Sartori; F. Brock Riggs

(57) ABSTRACT

The purpose of the present invention is to provide a magnetic recording medium including a magnetic recording layer having more excellent magnetic properties and including an $L1_0$ type ordered alloy. One constitutional example of the magnetic recording medium includes a substrate, a first seed layer comprising ZnO, a second seed layer comprising MgO, and a magnetic recording layer comprising an ordered alloy, in this order.

7 Claims, 15 Drawing Sheets

(58) Field of Classification Search
USPC .............................................. 428/831, 831.2
See application file for complete search history.

(56) References Cited

U.S. PATENT DOCUMENTS

| | | | |
|---|---|---|---|
| 2012/0307398 A1 | 12/2012 | Kanbe et al. | |
| 2013/0209836 A1 | 8/2013 | Ataka et al. | |
| 2013/0258523 A1 | 10/2013 | Maeda et al. | |
| 2014/0308542 A1* | 10/2014 | Zhang | G11B 5/73 428/831.2 |
| 2015/0085628 A1 | 3/2015 | Niwa et al. | |

FOREIGN PATENT DOCUMENTS

| | | |
|---|---|---|
| JP | 2004-348851 A | 12/2004 |
| JP | 2005-285207 A | 10/2005 |
| JP | 2008-159177 A | 7/2008 |
| JP | 2011-165232 A | 8/2011 |
| JP | 2013-206507 A | 10/2013 |
| JP | 2013-257930 A | 12/2013 |

OTHER PUBLICATIONS

Soshin Chikazumi, "Physics of Ferromagnetism (International Series of Monographs on Physics", pp. 256-262.
International Search Report in PCT International Application No. PCT/JP2015/004019, dated Oct. 13, 2015.
Written Opinion of the International Searching Authority in PCT International Application No. PCT/JP2015/004019, dated Oct. 13, 2015.
The First Office Action in counterpart Chinese Patent Application No. 201580002549.7, dated Feb. 14, 2017.

* cited by examiner

US 9,646,640 B2

MAGNETIC RECORDING MEDIUM

TECHNICAL FIELD

The present invention relates to a magnetic recording medium. In particular, the present invention relates to a magnetic recording medium used in a hard disc magnetic recording device (HDD).

BACKGROUND ART

Perpendicular magnetic recording system is adopted as a technique for increasing the magnetic recording density. A perpendicular magnetic recording medium at least comprises a non-magnetic substrate, and a magnetic recording layer formed of a hard-magnetic material. Optionally, the perpendicular magnetic recording medium may further comprise: a soft-magnetic under layer formed of a soft magnetic material and playing a role in concentrating the magnetic flux generated by a magnetic head onto the magnetic recording layer; an intermediate layer for orienting the hard-magnetic material in the magnetic recording layer in an intended direction; a protective film for protecting the surface of the magnetic recording layer; and the like.

It is proposed to use a granular magnetic material to form the magnetic recording layer in the magnetic recording medium, in order to obtain favorable magnetic properties. The granular magnetic material comprises magnetic crystal grains and non-magnetic body segregated to surround the magnetic crystal grains. Magnetic crystal grains within the granular magnetic material are magnetically separated from each other by the non-magnetic body.

For the purpose of further increasing the recording density of perpendicular magnetic recording media, an urgent need for reduction in the grain diameter of the magnetic crystal grains in the granular magnetic material arises in recent years. On the other hand, reduction in the grain diameter of the magnetic crystal grains leads to a decrease in thermal stability of the recorded magnetization (signals). Thus, the magnetic crystal grains in the granular magnetic material need to be formed of materials with higher magnetocrystalline anisotropies, in order to compensate the decrease in thermal stability due to the reduction in the grain diameter of the magnetic crystal grains. One of proposed materials having the required higher magnetocrystalline anisotropies is $L1_0$ type ordered alloys. Typical $L1_0$ type ordered alloys include FePt, CoPt, FePd, CoPd, and the like.

Japanese Patent Laid-Open No. 2005-285207 proposes a method for manufacturing a magnetic recording medium comprising a FePt magnetic thin film having a high coercive force, the method comprising the steps of: depositing FePt by a sputtering method at a substrate temperature from 650° C. to 850° C.; and applying a magnetic field from 4 kOe to 10 kOe (see PTL1). Here, Japanese Patent Laid-Open No. 2005-285207 also proposes to use a thin film of a material selected from the group consisting of MgO, ZnO, Cr and Pt, to form an intermediate layer onto which the FePt is deposited. However, the effect of the intermediate layer of the above-described material is not corroborated in Japanese Patent Laid-Open No. 2005-285207, although this document discusses the working effect in the case where a (001) monocrystalline MgO substrate is used. Further, Japanese Patent Laid-Open No. 2005-285207 does not teach or suggest to use a laminated structure consisting of different materials as the intermediate layer, at all.

Besides, several attempts have been made to improve the magnetic properties of the magnetic recording layer comprising an $L1_0$ ordered alloy with the layer formed under the magnetic recording layer. For Example, Japanese Patent Laid-Open No. 2011-165232 proposes a magnetic recording medium in which a magnetic recording layer is formed on an intermediate layer comprising MgO as a main component and one or more of additional oxides (see PTL2). In this proposal, promotion of separation between magnetic crystal grains, reduction in exchange interaction and reduction in a coercive force dispersion can be achieved by reducing a crystal grain diameter of the intermediate layer by addition of the additional oxides, and thereby forming one magnetic crystal grain in the magnetic recording layer onto one crystal grain in the intermediate layer (hereinafter, referred to as "one-to-one formation"). However, Japanese Patent Laid-Open No. 2011-165232 does not teach or suggest to use a laminated structure consisting of different materials as the intermediate layer, at all.

CITATION LIST

Patent Literature

PTL1: Japanese Patent Laid-Open No. 2005-285207
PTL2: Japanese Patent Laid-Open No. 2011-165232

Non Patent Literature

NPL1: R. F. Penoyer, "Automatic Torque Balance for Magnetic Anisotropy Measurements", The Review of Scientific Instruments, August 1959, Vol. 30, No. 8, pp. 711-714
NPL2: Soshin Chikazumi, "Physics of ferromagnetism Vol. II", Shokabo Co., Ltd., pp. 10-21

SUMMARY OF INVENTION

Technical Problem

The purpose of the present invention is to provide a magnetic recording medium including a magnetic recording layer having more excellent magnetic properties and including an $L1_0$ type ordered alloy.

Solution to Problem

The magnetic recording medium according to the present invention comprises a substrate, a first seed layer comprising ZnO, a second seed layer comprising MgO, and a magnetic recording layer comprising an ordered alloy, in this order. Here, the magnetic recording medium may further comprise an intermediate layer having a face-centered cubic lattice structure or a hexagonal closest packing structure, between the substrate and the first seed layer. Further, the ordered alloy may be an $L1_0$ type ordered alloy comprising at least one element selected from the group consisting of Fe and Co, and at least one element selected from the group consisting of Pt, Pd, Au, and Ir. Here, the ordered alloy may further comprise at least one element selected from the group consisting of Ni, Mn, Cu, Ru, Ag, Au, and Cr. Preferably, the ordered alloy is an $L1_0$ ordered alloy selected from the group consisting of FePt, CoPt, FePd, and CoPd. Further, the magnetic recording layer may have a granular structure comprising magnetic crystal grains and a non-magnetic grain boundary which surrounds the magnetic crystal grains, wherein the magnetic crystal grains comprise the ordered alloy. Here, the non-magnetic grain boundary may comprise a non-magnetic material selected from the group consisting of carbon, an oxide, and a nitride.

Advantageous Effects of Invention

By adopting the above-described configuration, it becomes possible to reduce the crystal axis orientation dispersion, arithmetic average roughness Ra and maximum height Rz of the first and second seed layers over which the magnetic recording layer is formed, thereby reducing the crystal axis orientation dispersion $\Delta\theta_{50}$ of the magnetic recording layer and improving the α value of an M-H hysteresis loop. Further, it becomes possible to decrease constituents ordered in the in-plane direction and to reduce a coercive force in the in-plane direction Hc_in. The magnetic recording medium of the present invention is suitable to be used in an energy-assisted recording system.

DESCRIPTION OF EMBODIMENTS

Figure 1:
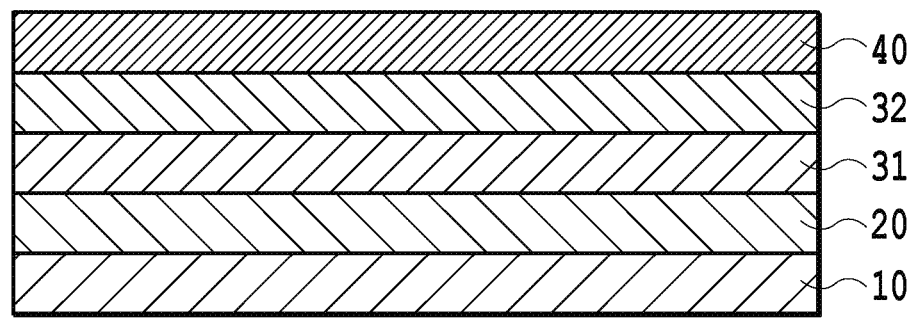
FIG. 1 is a cross-sectional diagram showing a configuration example of the magnetic recording medium according to the present invention.

The magnetic recording medium according to the present invention comprises a substrate, a first seed layer comprising ZnO, a second seed layer comprising MgO, and a magnetic recording layer comprising an ordered alloy, in this order. The magnetic recording medium according to the present invention may further comprise an intermediate layer comprising Pt, between the substrate and the first seed layer. Besides, the magnetic recording medium according to the present invention may further comprise layers known in the art such as an adhesive layer, a soft-magnetic under layer, and/or a heat sink layer, between the substrate and the first seed layer, or between the substrate and the intermediate layer. In addition, the magnetic recording medium according to the present invention may further comprise layers known in the art such as a protective layer and/or a liquid lubricant layer over the magnetic recording layer. FIG. 1 shows a configuration example of the magnetic recording medium according to the present invention, which comprises substrate 10, intermediate layer 20, first seed layer 31, second seed layer 32, and magnetic recording layer 40.

The substrate 10 may be various substrates having a flat surface. For example, the substrate 10 may be formed of material commonly used in magnetic recording media. Useful material includes a NiP-plated Al alloy, monocrystalline MgO, $MgAl_2O_4$, $SrTiO_3$, tempered glass, and crystallized glass.

The adhesive layer (not shown) that may be formed optionally is used for enhancing the adhesion between the layer formed on the adhesive layer and the layer formed under the adhesive layer. The layer formed under the adhesive layer includes the substrate 10. The material used for forming the adhesive layer includes a metal such as Ni, W, Ta, Cr or Ru, or an alloy containing the above-described metal. The adhesive layer may be a single lay or have a laminated structure with plural layers.

The soft-magnetic under layer (not shown) that may be formed optionally controls the magnetic flux emitted from a magnetic head, to improve the read-write characteristics of the magnetic recording medium. The material used for forming the soft-magnetic under layer includes: a crystalline material such as an NiFe alloy, a sendust (FeSiAl) alloy, or a CoFe alloy; a microcrystalline material such as FeTaC, CoFeNi or CoNiP; and an amorphous material including a Co alloy such as CoZrNb or CoTaZr. The optimum thickness of the soft-magnetic under layer depends on the structure and characteristics of the magnetic head used in magnetic recording. When forming the soft-magnetic under layer continuously with other layers, the soft-magnetic under layer preferably has a thickness in a range from 10 nm to 500 nm (both inclusive), in view of productivity.

When using the magnetic recording medium in a heat-assisted magnetic recording system, a heat sink layer may be provided. The heat sink layer is a layer for effectively absorbing excess heat of the magnetic recording layer 40 that is generated during heat-assisted magnetic recording. The heat sink layer can be formed of a material having a high thermal conductivity and a high specific heat capacity. Such material includes a Cu simple substance, an Ag simple substance, an Au simple substance, or an alloy material composed mainly of these substances. As used herein, the expression "composed mainly of" means that the content of the concerned material is 50 wt % or more. In consideration of its strength or the like, the heat sink layer can be formed of an Al—Si alloy, a Cu—B alloy or the like. Further, the function of concentrating a perpendicular magnetic field generated by the head can be imparted to the heat sink layer by forming it of a sendust (FeSiAl) alloy, a soft-magnetic CoFe alloy, or the like, and thereby complementing the function of the soft-magnetic under layer. The optimum thickness of the heat sink layer depends on the amount and distribution of heat generated during heat-assisted magnetic recording, as well as the layer configuration of the magnetic recording medium and the thickness of each constituent layer. When forming the heat sink layer continuously with other constituent layers, the heat sink layer preferably has a thickness of 10 nm or more and 100 nm or less, in view of the productivity. The heat sink layer can be formed by any process known in the art, such as a sputtering method or a vacuum deposition method. Normally, the heat sink layer is formed by the sputtering method. The heat sink layer can be formed between the substrate 10 and the adhesive layer, between the adhesive layer and the intermediate layer 20, or the like, in consideration of properties required for the magnetic recording medium.

The intermediate layer 20 is a layer for controlling crystallinity and/or crystal axis orientation of the first seed layer 31 and the second seed layer 32 which are formed over the intermediate layer 20. The intermediate layer 20 may be a single layer or may be formed with plural layers. Preferably, the intermediate layer 20 is non-magnetic. Preferably, the intermediate layer 20 is a layer having a crystalline structure of a face-centered cubic lattice structure or a hexagonal closest packing structure. In this case, the atomic closest-packed plane of the face-centered cubic lattice structure or the atomic closest-packed plane of the hexagonal closest packing structure is preferably oriented parallelly to the substrate plane. Non-magnetic material useful to form the intermediate layer 20 includes Pt metal, Cr metal, or alloys in which at least one metal selected from the group consisting of Mo, W, Ti, V, Mn, Ta, and Zr is added to Cr that is a main component. The intermediate layer 20 can be formed by any process known in the art, such as a sputtering method.

The first seed layer 31 comprises ZnO. Here, ZnO may be in a stoichiometric composition or in a non-stoichiometric composition. In the present invention, ZnO encompasses a series of compound, the XRD profile of which includes a peak of 2θ in a range from 33.4° to 35.4°, that is, a typical peak of ZnO crystal. The XRD profile is obtained by the θ-2θ measurement in a direction perpendicular to the surface using X-ray diffraction (XRD). It is considered that the first seed layer 31 has a function to reduce the crystal axis orientation dispersion of the second seed layer 32 comprising MgO, and thereby reducing the crystal axis orientation dispersion of the magnetic recording layer 40. In particular, it is considered that the crystal axis orientation dispersion of the second seed layer 32 is reduced due to the small surface roughness of the first seed layer 31. The first seed layer 31 preferably has a thickness in a range from 1 nm to 20 nm, in order to achieve the above-described effect.

The second seed layer 32 comprises MgO. Here, MgO may be in a stoichiometric composition or in a non-stoichiometric composition. In the present invention, MgO encompasses a series of compound, the XRD profile of which includes a peak of 2θ in a range from 42.0° to 44.0°, that is, a typical peak of MgO crystal. The XRD profile is obtained by the θ-2θ measurement in a direction perpendicular to the surface using X-ray diffraction. The second seed layer 32 improves crystal axis orientation of the magnetic recording layer 40 which is formed thereon, and thereby reducing the crystal axis orientation dispersion of the magnetic recording layer 40. Further, it is considered that the second seed layer 32 promotes separation of the magnetic crystal grains in the magnetic recording layer 40. The second seed layer 32 preferably has a thickness in a range from 1 nm to 20 nm, in order to achieve the above-described effect.

The first seed layer 31 and second seed layer 32 can be formed by any process known in the art, such as a sputtering method. Here, the surface roughness of the second seed layer 32 can be reduced by heating the substrate. The substrate temperature is preferably set to a range from 300° C. to 500° C., when forming the second seed layer 32. On the other hand, heating of the substrate is unnecessary during formation of the first seed layer 31 comprising ZnO. The first seed layer 31 formed without heating of the substrate can exhibit a surface roughness equal to or less than that of the second seed layer 32 formed with heating of the substrate.

The magnetic recording layer 40 comprises an ordered alloy. The above-described ordered alloy may comprise at least one of a first element selected from the group consisting of Fe and Co, and at least one of a second element selected from the group consisting of Pt, Pd, Au and Ir. Preferable ordered alloy includes $L1_0$ type ordered alloys selected from the group consisting of FePt, CoPt, FePd and CoPd. The ordered alloy may further comprise at least one element selected from the group consisting of Ni, Mn, Cu, Ru, Ag, Au and Cr, for modification of properties. Desirable modification of properties includes reduction in the temperature required for ordering of the $L1_0$ type ordered alloy.

In the ordered alloy useful in the present invention, the ratio of the first element to the second element may be in a range from 0.7 to 1.3, and preferably in a range from 0.8 to 1.1, based on the number of atoms. By adopting the compositional ratio within the above ranges, it becomes possible to obtain the $L1_0$ type ordered structure exhibiting a large magnetic anisotropy constant Ku.

Alternatively, the magnetic recording layer 40 may have a granular structure consisting of magnetic crystal grains and a non-magnetic grain boundary which surrounds the magnetic crystal grains. The magnetic crystal grains may comprise the above-described ordered alloy. The non-magnetic grain boundary may comprise a material including oxides such as $SiO_2$, $TiO_2$, and ZnO, nitrides such as SiN and TiN, carbon (C), or boron (B).

Further, the magnetic recording layer 40 may comprise a plurality of magnetic layers. Each of the magnetic layers may have a non-granular structure or a granular structure. The magnetic recording layer 40 may have an exchange-coupled composite (ECC) structure, in which a bonding layer such as Ru are deposited so as to be sandwiched between the magnetic layers. Further, a second magnetic layer as a continuous layer not including a granular structure (CAP layer) is formed over a magnetic layer having a granular structure.

The magnetic recording layer 40 can be formed by depositing given materials by a sputtering method. When forming the magnetic recording layer comprising the ordered alloy, targets comprising materials for constituting the ordered ally can be used. More particularly, a target comprising the elements for constituting the ordered alloy at a predetermined ratio can be used. Alternatively, the magnetic recording layer 40 may be formed by using a plurality of targets each of which comprises a single element, and adjusting electric powers applied to the targets to control the ratio among the elements. When forming the magnetic recording layer 40 having a granular structure, it is possible to use a target comprising a material for constituting the magnetic crystal grains and a material for constituting the non-magnetic grain boundary at a predetermined ratio. Alternatively, the magnetic recording layer 40 may be formed by using a target for constituting the magnetic crystal grains and a target for constituting the non-magnetic grain boundary, and adjusting electric powers applied to the respective targets to control the constitutional ratio between the magnetic crystal grains and the non-magnetic grain boundary. Here, when forming the magnetic crystal grains of the ordered alloy, a plurality of targets, each of which separately comprises an element for constituting the ordered alloy, may be used.

If the magnetic recording layer 40 comprises the ordered alloy, heating of the substrate is involved during formation of the magnetic recording layer 40. In this case, the substrate temperature is in a range from 300° C. to 450° C. By adopting the substrate temperature within this range, it becomes possible to improve the degree of order of the ordered alloy in the magnetic recording layer 50.

The protective layer (not shown) that may be optionally provided can be formed of a material that is conventionally used in the field of magnetic recording media. Specifically, the protective layer can be formed of non-magnetic metal such as Pt, a carbon-based material such as diamond-like carbon, or a silicon-based material such as silicon nitride. The protective layer may be a single layer or have a laminated structure. The laminated structure of the protective layer may be a laminated structure of two types of carbon-based material having different characteristics from each other, a laminated structure of metal and a carbon-based material, or a laminated structure of metallic oxide film and a carbon-based material, for example. The protective layer can be formed by any process known in the art such as a sputtering method, a CVD method, or a vacuum deposition method.

The liquid lubricant layer (not shown) that may be optionally provided can be formed of a material conventionally used in the field of magnetic recording media. For example, perfluoropolyether-based lubricants or the like can be used. The liquid lubricant layer can be formed by a coating method such as a dip-coating method or a spin-coating method, for example.

EXAMPLES

Experimental Example A

A chemically strengthened glass substrate having a flat surface (N-10 glass substrate manufactured by HOYA CORPORATION) was washed to prepare substrate 10. The washed substrate 10 was brought into an inline-type sputtering device. Then, a Ta adhesive layer having a thickness of 5 nm was formed by a DC magnetron sputtering method using a pure Ta target in Ar gas at a pressure of 0.3 Pa. The substrate temperature was room temperature (25° C.) when forming the Ta adhesive layer. The sputtering power was 200 W when forming the Ta adhesive layer.

Next, an MgO film having a thickness of 1 nm was formed by an RF magnetron sputtering method using an MgO target in Ar gas at a pressure of 0.3 Pa. The substrate temperature was room temperature (25° C.) when forming the MgO film. The sputtering power was 200 W when forming the MgO film. Subsequently, a Cr film having a thickness of 20 nm was formed by an DC magnetron sputtering method using a pure Cr target in Ar gas at a pressure of 0.3 Pa, to obtain intermediate layer 20 consisting of the MgO film and the Cr film. The substrate temperature was room temperature (25° C.) when forming the Cr film. The sputtering power was 200 W when forming the Cr film.

Next, MgO second seed layer 32 having a thickness of 10 nm was formed by an RF magnetron sputtering method using an MgO target in Ar gas at a pressure of 0.02 Pa. The substrate temperature was set to room temperature (25° C.), 300° C., and 400° C., when forming the MgO second seed layer 32. The sputtering power was 200 W when forming the MgO second seed layer 32.

Figure 2:
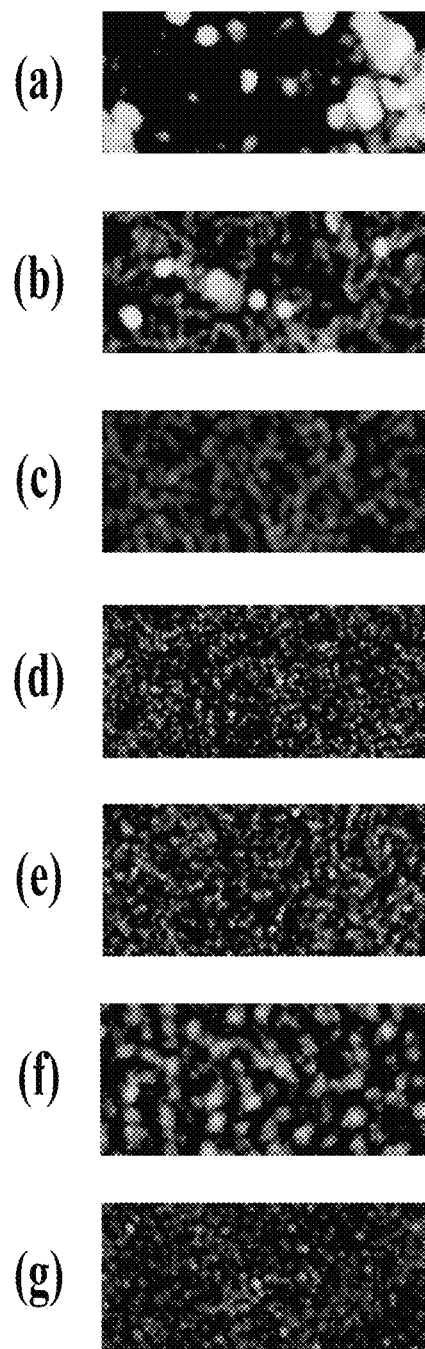
FIG. 2 shows AFM images of the surfaces of the magnetic recording media of Experimental Examples A to C, wherein diagrams (a) to (g) show an AFM image of each of the samples.

The arithmetic average roughness Ra and the maximum height Rz of the MgO second seed layer 32 which is the topmost layer of the obtained laminated bodies were measured with an atomic force microscope (AFM). FIG. 2 (a) shows an AFM image of the sample in which the MgO second seed layer 32 has been formed at room temperature, FIG. 2 (b) shows an AFM image of the sample in which the MgO second seed layer 32 has been formed at a temperature of 300° C., and FIG. 2(c) shows an AFM image of the sample in which the MgO second seed layer 32 has been formed at a temperature of 400° C. In the measurement, the dimensions of a measurement area were set to 1 μm by 1 μm. Further, two measurement areas per sample were measured, and the arithmetic average roughness Ra and maximum height Rz were determined as averages of the measured values, respectively. The measurement results were shown in Table 1.

Experimental Example B

The Ta adhesive layer was formed by the same procedure as Experimental Example A.

Next, ZnO first seed layer 31 having a thickness of 10 nm was formed by an RF magnetron sputtering method using an MgO target in Ar gas at a pressure of 0.3 Pa. The substrate temperature was room temperature (25° C.) when forming the ZnO first seed layer 31. The sputtering power was 200 W when forming the ZnO first seed layer 31.

The arithmetic average roughness Ra and the maximum height Rz of the ZnO first seed layer 31 was measured in accordance with the same procedure as Experimental Example A. FIG. 2(d) shows an AFM image. The measurement results were shown in Table 1.

Experimental Example C

The Ta adhesive layer was formed by repeating the same procedure as Experimental Example A.

Next, intermediate layers 20 having a thickness of 10 nm were formed by a magnetron sputtering method in Ar gas at a pressure of 0.3 Pa. Here, a pure Cr target, a pure Ag target, and a pure Pt target were used, respectively. The substrate temperature was room temperature (25° C.) when forming the intermediate layer 20. The sputtering power was 200 W when forming the intermediate layer 20.

Next, ZnO first seed layer 31 having a thickness of 10 nm was formed by an RF magnetron sputtering method using an MgO target in Ar gas at a pressure of 0.3 Pa. The substrate temperature was room temperature (25° C.) when forming the ZnO first seed layer 31. The sputtering power was 200 W when forming the ZnO first seed layer 31.

The arithmetic average roughness Ra and the maximum height Rz of the ZnO first seed layer 31 was measured in accordance with the same procedure as Experimental Example A. FIG. 2(e) shows an AFM image of the sample comprising the Cr intermediate layer 20, FIG. 2 (f) shows an AFM image of the sample comprising the Ag intermediate layer 20, and FIG. 2 (g) shows an AFM image of the sample comprising the Pt intermediate layer 20. The measurement results were shown in Table 1.

layer. In particular, the smallest arithmetic average roughness Ra and maximum height Rz is obtained when the ZnO first seed layer 31 is formed on the Pt intermediate layer 20 at room temperature.

Comparative Example 1

This comparative example relates to a magnetic recording medium not comprising the ZnO first seed layer 31.

The Ta adhesive layer, the intermediate layer 20 consisting of the MgO film and the Cr film, and the MgO second seed layer 32 were formed on the substrate 10 by repeating the same procedure as Experimental Example A, except that the substrate temperature when forming the MgO second seed layer 32 was set to 300° C. and the thickness of the MgO second seed layer 32 was set to 5 nm. The constitution of the intermediate layer and the seed layers and the substrate temperature when forming the seed layers were shown in Table 2.

Next, FePt magnetic recording layer 40 having a thickness of 10 nm was formed onto the MgO second seed layer 32 by an RF sputtering method in Ar gas at a pressure of 1.0 Pa. The substrate temperature was set to 400° C. when forming the FePt magnetic recording layer 40. The sputtering power was 200 W when forming the FePt magnetic recording layer 40.

Finally, a protective layer of a laminated structure of a Pt film having a thickness of 5 nm and a Ta film having a thickness of 5 nm was formed by an RF sputtering method

TABLE 1

Surface roughness of the seed layers

| | Intermediate layer*[1] | First seed layer*[1] | Second seed layer*[1] | Substrate temperature when forming the seed layer | Arithmetic average roughness Ra (nm) | Maximum height Rz (nm) |
|---|---|---|---|---|---|---|
| Experimental Example A | MgO(1), Cr(20)*[2] | — | MgO(10) | r.t. | 2.273 | — |
| | MgO(1), Cr(20)*[2] | — | MgO(10) | 300° C. | 0.511 | 9.034 |
| | MgO(1), Cr(20)*[2] | — | MgO(10) | 400° C. | 0.475 | — |
| Experimental Example B | — | ZnO(10) | — | r.t. | 0.367 | 3.694 |
| Experimental Example C | Cr(10) | ZnO(10) | — | r.t. | 0.371 | 4.330 |
| | Ag(10) | ZnO(10) | — | r.t. | 0.485 | 5.292 |
| | Pt(10) | ZnO(10) | — | r.t. | 0.232 | 3.681 |

*[1] values in parentheses show a thickness in nm.
*[2] a laminated structure of an MgO film and a Cr film formed on the MgO film.

From the results of Experimental Example A, it is understood that the MgO second seed layer 32 formed at room temperature has a very large arithmetic average roughness Ra, and the arithmetic average roughness Ra decreases with rise in the substrate temperature during formation. Besides, the effect of decreasing the arithmetic average roughness Ra reaches the ceiling peak at the substrate temperature around 400° C. In consideration of influence on the substrate 10, the adhesive layer, the intermediate layer 20 and the like, it is not practical to adopt the substrate temperature of 400° C. or higher.

On the other hand, from the result of Experimental Example B, it is understood that the ZnO first seed layer 31 formed at room temperature has the arithmetic average roughness Ra and maximum height Rz smaller than those of the MgO second seed layer formed at a temperature of 400° C. Further, from the results of Experimental Examples B and C, it is understood that the surface roughness of the ZnO first seed layer 31 is influenced by the material of the underlying using a Pt target and a Ta target in Ar gas at a pressure of 0.5 Pa, to obtain a magnetic recording medium. The substrate temperature was room temperature (25° C.) when forming the protective layer. The sputtering power was 200 W when forming the Pt film and the Ta film.

The resultant magnetic recording medium was analyzed by an X-ray diffraction method (XRD) to determine integrated intensities of a (001) FePt peak and a (002) FePt peak due to the FePt magnetic recording layer 40. Subsequently, the crystal axis orientation dispersion $\Delta\theta_{50}$ of the FePt magnetic recording layer 40 was determined by analyzing the (002) FePt peak with a rocking curve method. Further, the degree of order was determined as a square root of a quotient of a ratio of the measured integrated intensity of the (001) peak to that of the (002) peak divided by a theoretically calculated ratio of the integrated intensity of the (001) peak to that of the (002) peak in the case where the ordered alloy is completely ordered. The measurement results were shown in Table 3.

The M-H hysteresis loop of the resultant magnetic recording medium was measured with a PPMS apparatus (Physical Property Measurement System, manufactured by Quantum Design, Inc.). Saturated magnetization Ms and an α value of the M-H hysteresis loop were determined by the obtained M-H hysteresis loop. The α value means a slope of the magnetization curve in the vicinity of a coercive force (H=Hc), and calculated by the equation of $\alpha = 4\pi \times (dM/dH)$. When determining the α value, a unit "emu/cm$^3$" is used as the unit of M, and a unit "Oe" is used as the unit of H. The α value increases if the magnetic crystal grains in the magnetic recording layer 40 are not magnetically separated well. On the other hand, the α value decreases if the magnetic properties of the magnetic crystal grains vary greatly, in such a case where crystal grains due to secondary growth are present. The α value is preferably in a range of 0.75 or more and less than 3.0, and more preferably in a range of 0.9 or more and less than 2.0. The magnetic anisotropy constant Ku of the obtained magnetic recording medium was determined by evaluating, with a PPMS apparatus (Physical Property Measurement System, manufactured by Quantum Design, Inc.), the dependence of spontaneous magnetization on the angle at which the magnetic field is applied. The magnetic anisotropy constant Ku was determined in accordance with the method described in the publications: R. F. Penoyer, "Automatic Torque Balance for Magnetic Anisotropy Measurement", The Review of Scientific Instruments, August 1959, Vol. 30, No. 8, pp. 711-714; and Soshin Chikazumi, "Physics of ferromagnetism Vol. II", Shokabo Co., Ltd., pp. 10-21 (see NPL 1 and NPL 2). The measurement results were shown in Table 3.

Comparative Example 2

This comparative example relates to a magnetic recording medium not comprising the MgO second seed layer 32.

The Ta adhesive layer and the Pt intermediate layer 20 were formed on the substrate 10 in accordance with the same procedure as Experimental Example C, except that the intermediate layer 20 was formed of Pt.

Next, ZnO first seed layer 31 having a thickness of 10 nm was formed by an RF magnetron sputtering method using an ZnO target in Ar gas at a pressure of 0.3 Pa. The substrate temperature was 400° C. when forming the ZnO first seed layer 31. The sputtering power was 200 W when forming the ZnO first seed layer 31. The constitution of the intermediate layer and the seed layers, and the substrate temperature when forming the seed layers were shown in Table 2.

Next, the magnetic recording layer 40 and the protective layer consisting of the Pt film and the Ta film were formed on the ZnO first seed layer 31 in accordance with the same procedure as Comparative Example 1, to obtain a magnetic recording medium. The measurement results of the magnetic properties of the obtained magnetic recording medium were shown in Table 3.

Comparative Example 3

This comparative example relates to a magnetic recording medium not comprising the MgO second seed layer 32.

A magnetic recording medium was obtained by repeating the procedure of Comparative Example 2, except that the substrate temperature when forming the ZnO first seed layer 31 is changed to room temperature (25° C.). The constitution of the intermediate layer and the seed layers, and the substrate temperature when forming the seed layers were shown in Table 2. The measurement results of the magnetic properties of the obtained magnetic recording medium were shown in Table 3.

Example 1

This example relates to a magnetic recording medium according to the present invention, comprising both of the ZnO first seed layer 31 and the MgO second seed layer 32. In this example, the ZnO first seed layer 31 was formed at the substrate temperature of 300° C.

The Ta adhesive layer and the Pt intermediate layer 20 were formed on the substrate 10 in accordance with the same procedure as Experimental Example C, except that the intermediate layer 20 was formed of Pt.

Next, ZnO first seed layer 31 having a thickness of 10 nm was formed by an RF magnetron sputtering method using an ZnO target in Ar gas at a pressure of 0.3 Pa. The substrate temperature was 300° C. when forming the ZnO first seed layer 31. The sputtering power was 200 W when forming the ZnO first seed layer 31.

Next, MgO second seed layer 32 having a thickness of 5 nm was formed by an RF magnetron sputtering method using an MgO target in Ar gas at a pressure of 0.02 Pa. The substrate temperature was set to 300° C. when forming the MgO second seed layer 32. The sputtering power was 200 W when forming the MgO second seed layer 32. The constitution of the intermediate layer and the seed layers, and the substrate temperature when forming the seed layers were shown in Table 2.

Next, the magnetic recording layer 40 and the protective layer consisting of the Pt film and the Ta film were formed on the MgO second seed layer 32 in accordance with the same procedure as Comparative Example 1, to obtain a magnetic recording medium. The measurement results of the magnetic properties of the obtained magnetic recording medium were shown in Table 3.

Example 2

This example relates to a magnetic recording medium according to the present invention, comprising both of the ZnO first seed layer 31 and the MgO second seed layer 32. In this example, the ZnO first seed layer 31 was formed at room temperature (25° C.)

A magnetic recording medium was obtained by repeating the procedure of Example 1, except that the substrate temperature when forming the ZnO first seed layer 31 was changed to room temperature (25° C.). The constitution of the intermediate layer and the seed layers, and the substrate temperature when forming the seed layers were shown in Table 2. The measurement results of the magnetic properties of the obtained magnetic recording medium were shown in Table 3.

Example 3

This example relates to a magnetic recording medium according to the present invention, comprising both of the ZnO first seed layer 31 and the MgO second seed layer 32. In this example, the ZnO first seed layer 31 was formed at room temperature (25° C.), and the thickness of the MgO second seed layer 32 was changed to 2 nm.

A magnetic recording medium was obtained by repeating the procedure of Example 2, except that the thickness of the MgO second seed layer 32 was changed to 2 nm. The constitution of the intermediate layer and the seed layers, and the substrate temperature when forming the seed layers were shown in Table 2. The measurement results of the magnetic properties of the obtained magnetic recording medium were shown in Table 3.

TABLE 2

Constitution of the base layer and the seed layers

| | | First seed layer | | Second seed layer | |
|---|---|---|---|---|---|
| | Intermediate layer*[1] | Material*[1] | Substrate temperature during formation | Material*[1] | Substrate temperature during formation |
| Comp. Ex. 1 | MgO(1), Cr(20) *[2] | — | — | MgO(5) | 300° C. |
| Comp. Ex. 2 | Pt(10) | ZnO(10) | 400° C. | — | — |
| Comp. Ex. 3 | Pt(10) | ZnO(10) | r.t. | — | — |
| Ex. 1 | Pt(10) | ZnO(10) | 300° C. | MgO(5) | 300° C. |
| Ex. 2 | Pt(10) | ZnO(10) | r.t. | MgO(5) | 300° C. |
| Ex. 3 | Pt(10) | ZnO(10) | r.t. | MgO(2) | 300° C. |

*[1] values in parentheses show a thickness in nm.
*[2] a laminated structure of an MgO film and a Cr film formed on the MgO film.

TABLE 3

Magnetic properties of the magnetic recording medium

| | Saturated magnetization Ms | α | Magnetic anisotropy constant Ku | Degree of order | Integrated intensitis of XRD peaks | | Crystal axis orientation dispersion |
|---|---|---|---|---|---|---|---|
| | (emu/cm$^3$)*[3] | value | (×10$^7$ erg/cm$^3$)*[4] | | FePt (001) | FePt (002) | $\Delta\theta_{50}$ |
| Comp. Ex. 1 | 1042 | 14.34 | 3.03 | 0.97 | 11412 | 6795 | 7.47 |
| Comp. Ex. 2 | — | — | — | 0.60 | 2074 | 3259 | — |
| Comp. Ex. 3 | — | — | — | 0.68 | 2140 | 2651 | — |
| Ex. 1 | 1037 | 10.19 | 2.86 | 0.86 | 18536 | 14040 | 4.53 |
| Ex. 2 | 1060 | 12.93 | 2.83 | 0.82 | 17484 | 14860 | 4.44 |
| Ex. 3 | 1003 | 9.76 | 2.61 | 0.88 | 14618 | 10688 | 5.51 |

*[3] 1 emu/cm$^3$ = 1 A/mm
*[4] 10$^7$ erg/cm$^3$ = 1 J/cm$^3$

In the magnetic recording media of Comparative Examples 2 and 3 in which the magnetic recording layer 40 was formed on the ZnO first seed layer 31, the integrated intensities of the FePt (001) peak and FePt (002) peak were remarkably small. This is because the FePt alloy in the magnetic recording layer 40 was in a (111) oriented state. In other words, the axis of easy magnetization was not perpendicular to the principal plane of the magnetic recording medium. Therefore, other magnetic properties were not evaluated in Comparative Examples 2 and 3.

In the magnetic recording medium of Comparative Example 1 wherein the ZnO first seed layer 31 was not present, and the magnetic recording layer 40 was formed on the MgO second seed layer 32, the FePt alloy in the magnetic recording layer 40 was in a (001) oriented state, as apparent from the integrated intensities of the FePt (001) and FePt (002) peaks as measured by XRD, and, therefore, the axis of easy magnetization was perpendicular to the principal plane of the magnetic recording medium. However, the magnetic recording medium of Comparative Example 1 had a relatively large value of the crystal axis orientation dispersion $\Delta\theta_{50}$. It is considered that this is due to the large surface roughness of the MgO second seed layer 32. Further, the α value of the M-H hysteresis loop of the magnetic recording medium of Comparative Example 1 was relatively large. This means that the degree of magnetic separation of the magnetic crystal grains in the magnetic recording layer was slightly low.

On the contrary, the magnetic recording media of Examples 1 to 3, in which the ZnO first seed layer 31, the MgO second seed layer 32, and the magnetic recording layer 40 were formed in this order, exhibited larger integrated intensities of the FePt (001) and FePt (002) peaks than those of the magnetic recording medium of Comparative Example 1. In addition, the magnetic recording media of Examples 1 to 3 exhibited smaller value of the crystal axis orientation dispersion $\Delta\theta_{50}$, in comparison with the magnetic recording medium of Comparative Example 1. Based on these results, the crystal axis orientation of the FePt alloy in the magnetic recording layer was improved by depositing the ZnO first seed layer 31 and the MgO second seed layer 32.

Besides, the magnetic recording media of Examples 1 to 3 had comparable saturated magnetization Ms and magnetic anisotropy constant Ku to those of the magnetic recording medium of Comparative Example 1. In the magnetic recording media of Examples 1 to 3, a slight decrease in the degree of order of the FePt ordered alloy in the magnetic recording layer 40 was observed. However, the decrease in the degree of order is within the range not to cause any problem in the application to the magnetic recording medium.

Further, the magnetic recording media of Examples 1 to 3 has smaller α values than that of the magnetic recording medium of Comparative Example 1. Based on this result, it is understood that better magnetic separation of the magnetic crystal grains is achieved in the magnetic recording layer of the magnetic recording media of Examples 1 to 3.

From the above results, it was understood that the magnetic recording medium of the present invention comprising the first seed layer comprising ZnO and the second seed layer comprising MgO provides the smaller crystal axis orientation dispersion $\Delta\theta_{50}$ and the excellent α value showing favorable magnetic separation of the magnetic crystal grains, without deterioration of other magnetic properties.

Example 4

This example relates to magnetic recording media according to the present invention, comprising both of the ZnO first seed layer 31 and the MgO second seed layer 32. In this example, the ZnO first seed layer 31 was formed at room temperature (25° C.), and the MgO second seed layer 32 was formed at a temperature of 400° C.

A magnetic recording media were obtained by repeating the procedure of Example 2, except that the substrate temperature when forming the MgO second seed layer 32 was changed to 400° C., and the thickness of the MgO second seed layer 32 to be formed was changed within a range from 1 to 10 nm. The constitutions and the measurement results of the properties of the obtained magnetic recording media were shown in Table 4.

Example 5

This example relates to magnetic recording media according to the present invention, comprising both of the ZnO first seed layer and the MgO second seed layer 32. In this example, the ZnO first seed layer 31 was formed at room temperature (25° C.), and the MgO second seed layer 32 was formed at a temperature of 300° C.

A magnetic recording media were obtained by repeating the procedure of Example 2, except that the thickness of the MgO second seed layer 32 to be formed was changed within a range from 1 to 10 nm. The constitutions and the measurement results of the properties of the obtained magnetic recording media were shown in Table 4. Note that the sample comprising the MgO second seed layer having a thickness of 10 nm is the same as the medium of the above-described Example 2, and the sample comprising the MgO second seed layer having a thickness of 2 nm is the same as the medium of the above-described Example 3.

Comparative Example 4

This example relates to magnetic recording media not comprising the ZnO first seed layer 31. In this example, the MgO second seed layer 32 was formed at a temperature of 400° C.

A magnetic recording media were obtained by repeating the procedure of Comparative Example 1, except that the substrate temperature when forming the MgO second seed layer 32 was changed to 400° C., and the thickness of the MgO second seed layer 32 to be formed was changed within a range from 1 to 10 nm. The constitutions and the measurement results of the properties of the obtained magnetic recording media were shown in Table 4.

Comparative Example 5

This example relates to magnetic recording media not comprising the ZnO first seed layer 31. In this example, the MgO second seed layer 32 was formed at a temperature of 300° C.

A magnetic recording media were obtained by repeating the procedure of Comparative Example 1, except that the thickness of the MgO second seed layer 32 to be formed was changed within a range from 1 to 10 nm. The constitutions and the measurement results of the properties of the obtained magnetic recording media were shown in Table 4. Note that the sample comprising the MgO second seed layer having a thickness of 5 nm is the same as the medium of the above-described Comparative Example 1.

TABLE 4

Constitutions and properties of the magnetic recording media of Examples 4 and 5 and Comparative Examples 4 and 5

| | First seed layer 31 | MgO second seed layer 32 Forming temperature (° C.) | Thickness (nm) | Integrated intensity of FePt (001) peak | $\Delta\theta_{50}$ (deg.) | Ra (nm) |
|---|---|---|---|---|---|---|
| Ex. 4 | Present | 400 | 1 | — | 6.34 | 0.48 |
| | | | 2 | 18190 | 5.87 | 0.58 |
| | | | 4 | 21439 | 4.90 | 0.51 |
| | | | 6 | 25564 | 4.36 | 0.58 |
| | | | 8 | 25525 | 4.06 | 0.58 |
| | | | 10 | 27288 | 3.81 | 0.54 |
| C. Ex. 4 | Absent | 400 | 1 | 10982 | 7.24 | 0.78 |
| | | | 2 | 12473 | 7.59 | 0.89 |
| | | | 4 | 15006 | 6.78 | 0.82 |
| | | | 6 | 14843 | 6.55 | 0.79 |
| | | | 8 | 14843 | 6.07 | 0.76 |
| | | | 10 | 17969 | 5.77 | 0.76 |
| Ex. 5 | Present | 300 | 1 | 16758 | 5.73 | 0.59 |
| | | | 2 | 14618 | 5.51 | 0.57 |
| | | | 3 | 17776 | 5.18 | 0.47 |
| | | | 4 | 19853 | 4.55 | 0.62 |
| | | | 5 | 17484 | 4.44 | 0.50 |
| C. Ex. 5 | Absent | 300 | 1 | 9900 | 7.70 | 0.80 |
| | | | 2 | 10990 | 8.15 | 0.78 |
| | | | 4 | 11497 | 7.94 | 0.71 |
| | | | 6 | 14063 | 7.51 | 0.78 |
| | | | 8 | 15408 | 6.88 | 0.75 |
| | | | 10 | 14244 | 6.85 | 0.67 |

The following matters became apparent, from comparison between Example 4 and Comparative Example 4 and comparison between Example 5 and Comparative Example 5, the temperature at which the MgO second seed layer 32 was formed being the same in each of the comparisons.

Figure 3A:
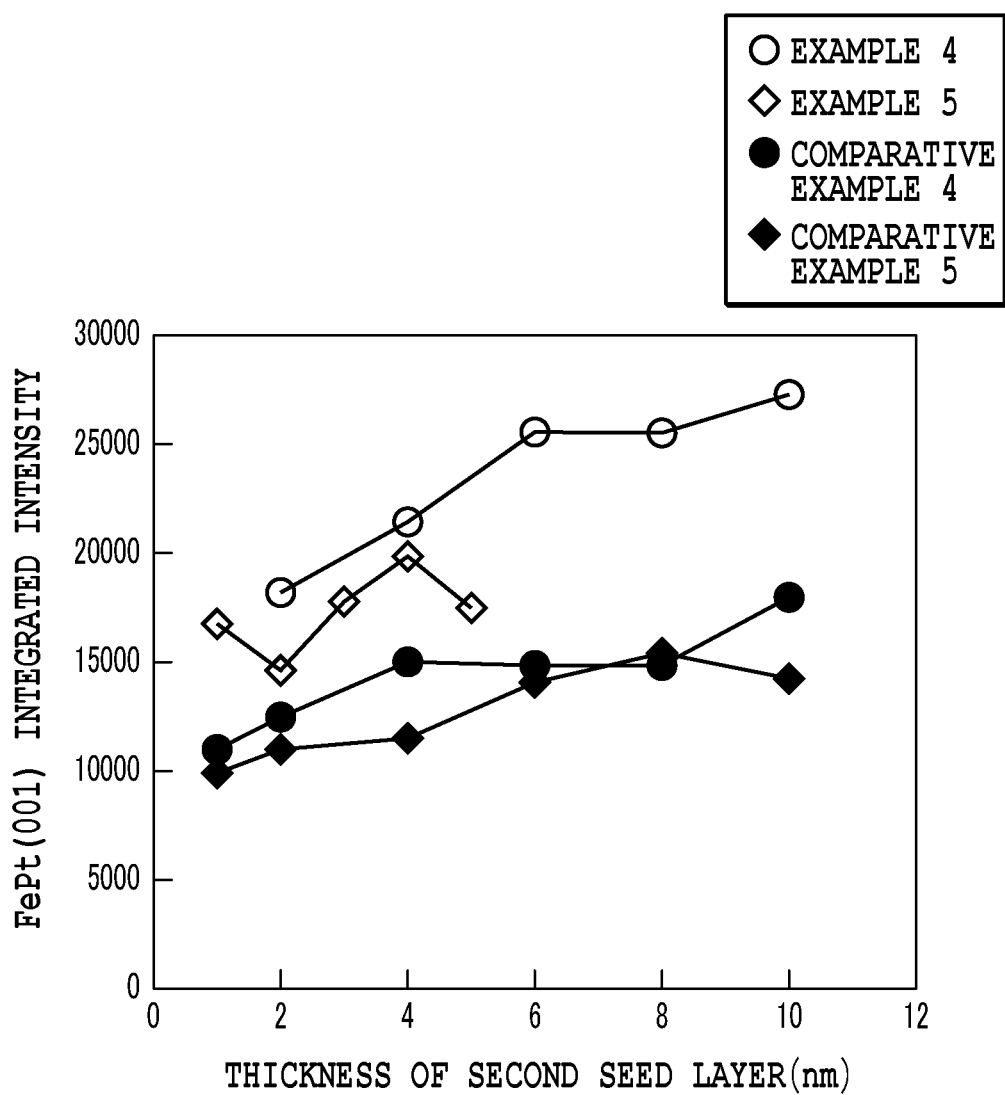
FIG. 3A is a graphical representation showing the relationship between the thickness of the MgO second seed layer and the integrated intensity of the (001) FePt peak of the magnetic recording layer, of the magnetic recording media of Examples 4 and 5, and Comparative Examples 4 and 5.

(a) The relationship between the thickness of the MgO second seed layer 32 and the integrated intensity of the FePt (001) peak is shown in FIG. 3A. In comparison between the samples having the same thickness, the magnetic recording media of Examples 4 and 5 have larger integrated intensities of the FePt (001) peak than those of the magnetic recording media of Comparative Examples 4 and 5. This result shows that the crystallinity of the FePt alloy in the magnetic recording layer 40 is improved by the presence of the ZnO first seed layer 31. Further, the tendency of increasing the integrated intensity of the FePt (001) peak with increase in thickness of the MgO second seed layer 32 was recognized from FIG. 3A.

Figure 3B:
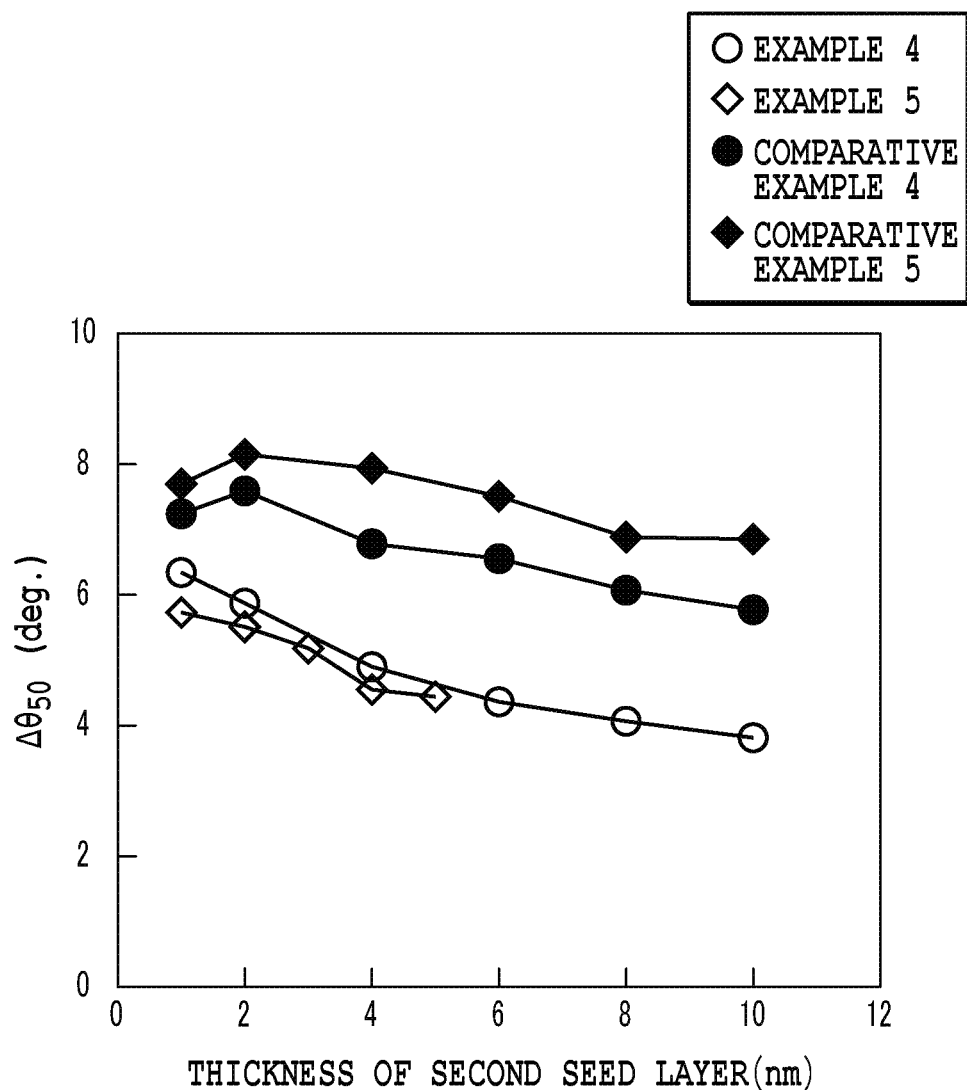
FIG. 3B is a graphical representation showing the relationship between the thickness of the MgO second seed layer and the crystal axis orientation dispersion $\Delta\theta_{50}$ of the magnetic recording layer, of the magnetic recording media of Examples 4 and 5, and Comparative Examples 4 and 5.

(b) The relationship between the thickness of the MgO second seed layer 32 and the crystal axis orientation dispersion $\Delta\theta_{50}$ of the magnetic recording layer 40 is shown in FIG. 3B. In comparison between the samples having the same thickness, the magnetic recording media of Examples 4 and 5 have smaller crystal axis orientation dispersion $\Delta\theta_{50}$ than that of the magnetic recording media of Comparative Examples 4 and 5. This result shows that the crystal axis orientation of the FePt alloy in the magnetic recording layer 40 is improved by the presence of the ZnO first seed layer 31. Further, the tendency of increasing the integrated intensity of the FePt (001) peak with increase in thickness of the MgO second seed layer 32 was recognized from FIG. 3B.

Figure 3C:
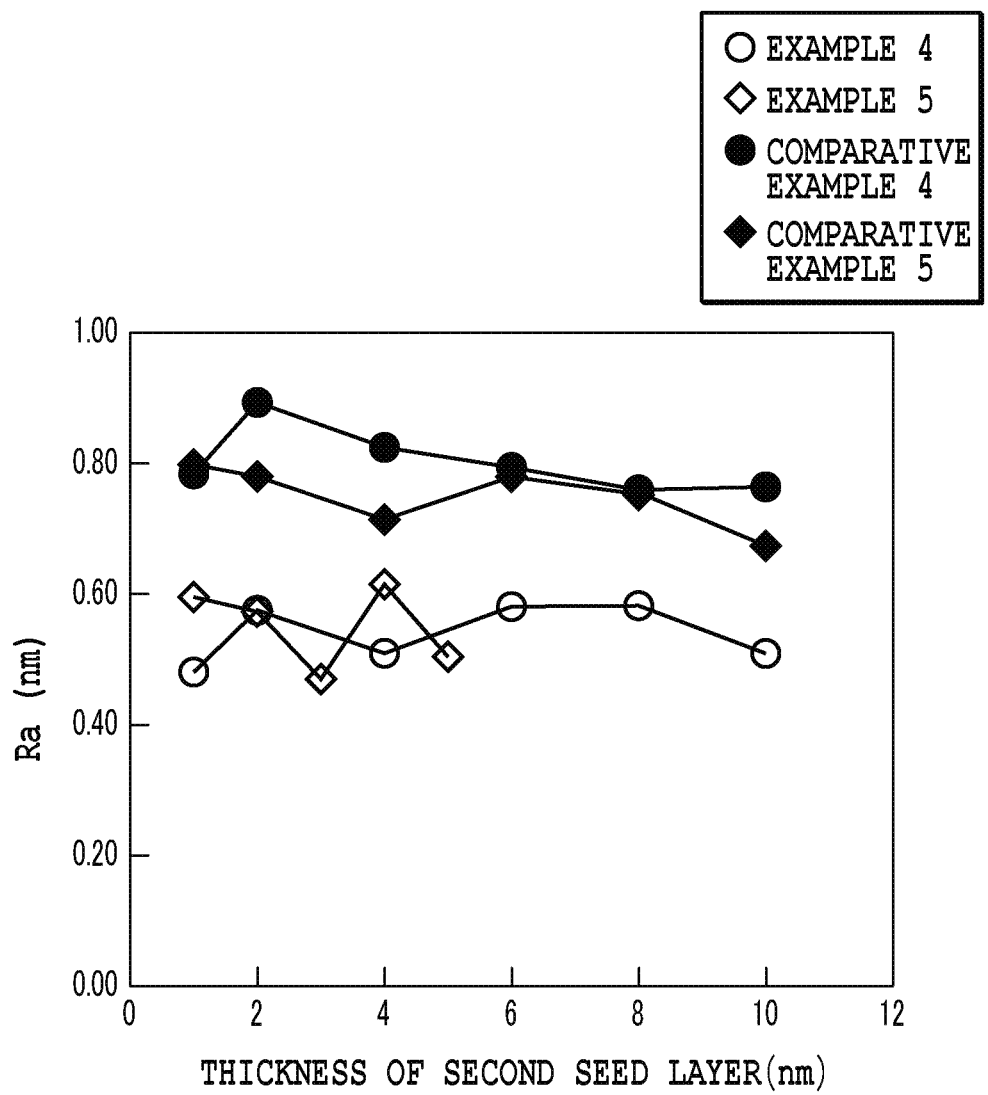
FIG. 3C is a graphical representation showing the relationship between the thickness of the MgO second seed layer and the arithmetic average roughness Ra of the surface of the magnetic recording medium, of the magnetic recording media of Examples 4 and 5, and Comparative Examples 4 and 5.

(c) The relationship between the thickness of the MgO second seed layer 32 and the arithmetic average roughness Ra of the magnetic recording layer 40 is shown in FIG. 3C. In comparison between the samples having the same thickness, the magnetic recording media of Examples 4 and 5 have smaller arithmetic average roughness Ra than that of the magnetic recording media of Comparative Examples 4 and 5. This result shows that the smoothness of the surface of the magnetic recording layer 40 is improved by the presence of the ZnO first seed layer 31. Besides, it is considered from FIG. 3C that the influence of the thickness of the MgO second seed layer 32 on the arithmetic average roughness Ra is small.

As described above, it has become apparent that combination of the ZnO first seed layer 31 with the MgO second seed layer 32 having a thickness from 1 nm to 10 nm makes it possible to form the magnetic recording layer 40 having superior crystallinity, superior crystal axis orientation and superior smoothness, and thereby enhancing the expectation that the magnetic recording medium having superior magnetic properties will be obtained.

Example 6

This example relates to magnetic recording media according to the present invention, comprising both of the ZnO first seed layer 31 and the MgO second seed layer 32. In this example, the ZnO first seed layer 31 was formed at room temperature (25° C.), and the MgO second seed layer 32 was formed at a temperature of 300° C.

A magnetic recording media were obtained by repeating the procedure of Example 2, except that the thickness of the ZnO first seed layer 31 to be formed was changed within a range from 2 to 20 nm. The constitutions and the measurement results of the properties of the obtained magnetic recording media were shown in Table 5. Note that the sample comprising the ZnO first seed layer 31 having a thickness of 10 nm is the same as the medium of the above-described Example 2. Further, the constitution and properties of Comparative Example 1 was also shown in Table 5, for the purpose of comparison.

TABLE 5

Constitutions and properties of the magnetic recording media of Example 6 and Comparative Example 1

| | Thickness of ZnO first seed layer 31 (nm) | Integrated intensity of FePt (001) peak | $\Delta\theta_{50}$ (deg.) | Ra (nm) |
|---|---|---|---|---|
| Ex. 6 | 2 | 15635 | 4.64 | 0.51 |
| | 4 | 14543 | 4.63 | 0.44 |
| | 6 | 16616 | 4.45 | 0.55 |
| | 8 | 15893 | 4.50 | 0.51 |
| | 10 | 17484 | 4.44 | 0.52 |
| | 15 | 17582 | 4.33 | 0.60 |
| | 20 | 11965 | 4.84 | 0.58 |
| C. Ex. 1 | 0 | 11412 | 7.47 | 0.71 |

Figure 4A:
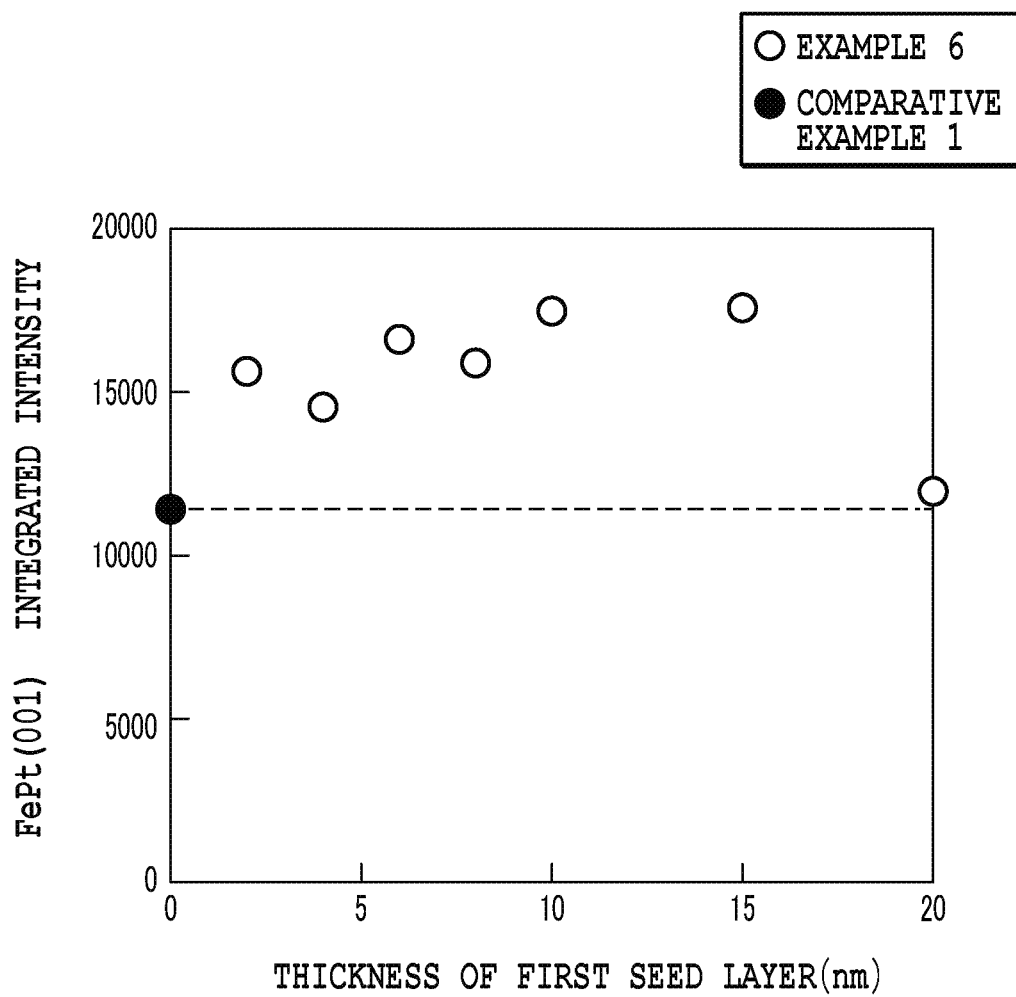
FIG. 4A is a graphical representation showing the relationship between the thickness of the ZnO first seed layer and the integrated intensity of the (001) FePt peak of the magnetic recording layer, of the magnetic recording media of Example 6 and Comparative Example 1.
Figure 4B:
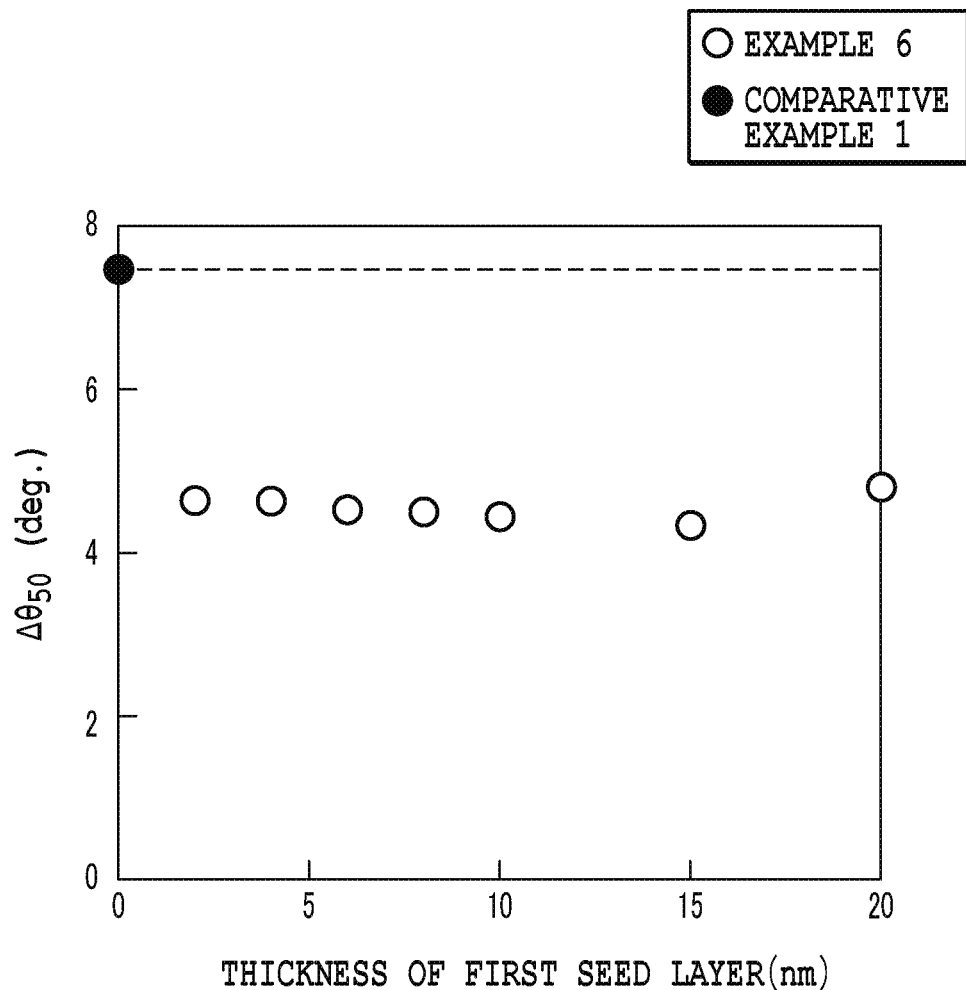
FIG. 4B is a graphical representation showing the relationship between the thickness of the ZnO first seed layer and the crystal axis orientation dispersion $\Delta\theta_{50}$ of the magnetic recording layer, of the magnetic recording media of Example 6 and Comparative Example 1.
Figure 4C:
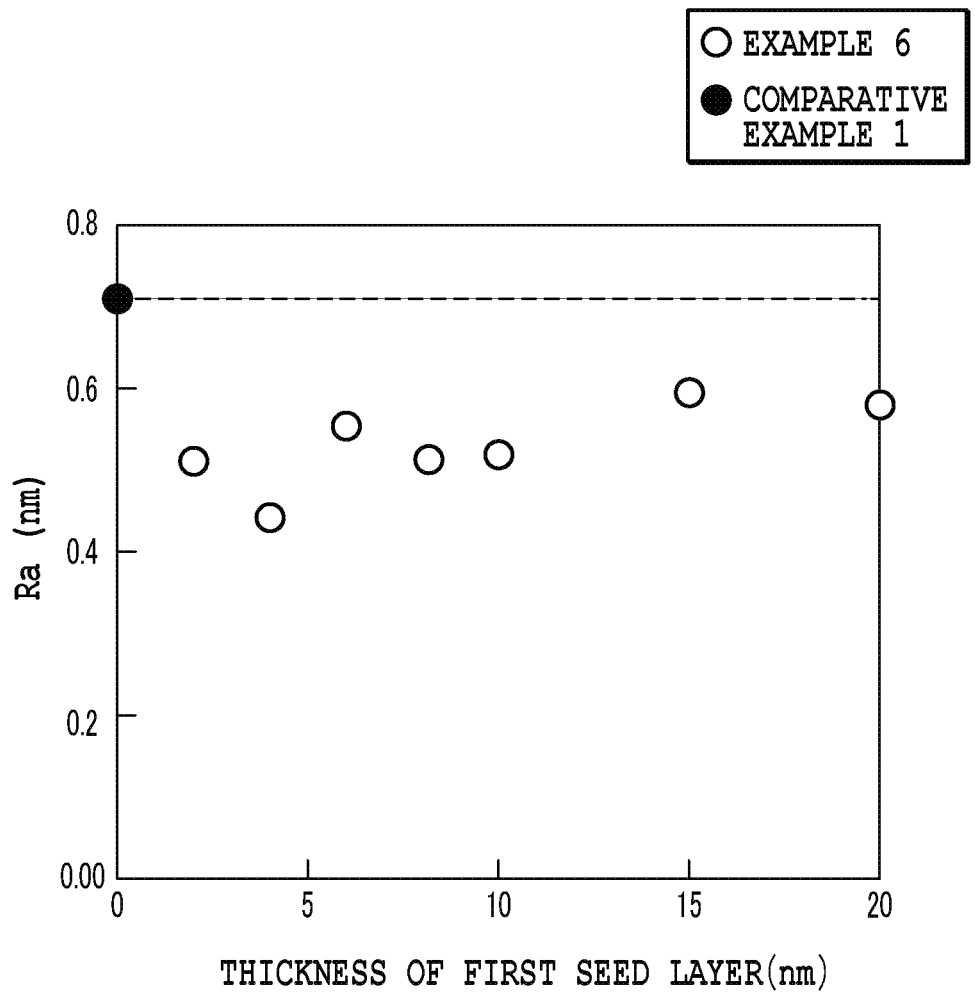
FIG. 4C is a graphical representation showing the relationship between the thickness of the ZnO first seed layer and the arithmetic average roughness Ra of the surface of the magnetic recording medium, of the magnetic recording media of Example 6 and Comparative Example 1.

In regard to the magnetic recording media of Example 6 and Comparative Example 1, the relationship between the thickness of the ZnO first seed layer 31 and the integrated intensity of the FePt (001) peak of the magnetic recording layer 40 is shown in FIG. 4A, the relationship between the thickness of the ZnO first seed layer 31 and the crystal axis orientation dispersion $\Delta\theta_{50}$ of the magnetic recording layer 40 is shown in FIG. 4B, and the relationship between the thickness of the ZnO first seed layer 31 and the arithmetic average roughness Ra of the magnetic recording layer 40 is shown in FIG. 4C. In accordance with Table 5, FIG. 4B and FIG. 4C, it is understood that decrease in the crystal axis orientation dispersion of the FePt alloy in the magnetic recording layer and decrease in the arithmetic average roughness of the magnetic recording medium are achieved by using the ZnO first seed layer 31 having a thickness from 2 to 20 nm. Further, in accordance with Table 5 and FIG. 4A, it is recognized that the integrated intensity of the FePt (001) peak of the magnetic recording layer 40 increases significantly in the cases where the thickness of the ZnO first seed layer is from 2 to 15 nm, and, the integrated intensity of the FePt (001) peak of the magnetic recording layer 40 increases even in the case where the thickness of the ZnO first seed layer is 20 nm. In view of these results, it has become apparent that the thickness of the ZnO first seed layer 31 of from 2 to 18 nm, especially from 2 to 15 nm, makes it possible to form the magnetic recording layer 40 having superior crystallinity, superior crystal axis orientation and superior smoothness, and thereby enhancing the expectation that the magnetic recording medium having superior magnetic properties will be obtained.

Example 7

This example relates to magnetic recording media according to the present invention, comprising both of the ZnO first seed layer 31 and the MgO second seed layer 32. In this example, the ZnO first seed layer 31 having a thickness of 10 nm was formed at room temperature (25° C.), and the MgO second seed layer 32 having a thickness of 5 nm was formed at a temperature of 300° C.

A magnetic recording media were obtained by repeating the procedure of Example 2, except that the thickness of the Pt intermediate layer 20 to be formed was changed within a range from 2 to 20 nm. The constitutions and the measurement results of the properties of the obtained magnetic recording media were shown in Table 6. Note that the sample comprising the Pt intermediate layer 20 having a thickness of 10 nm is the same as the medium of the above-described Example 2. Further, the constitution and properties of Comparative Example 1 was also shown in Table 6, for the purpose of comparison.

TABLE 6

Constitutions and properties of the magnetic recording media of Example 7 and Comparative Example 1

| | Thickness of Pt intermediate layer 20 (nm) | Integrated intensity of FePt (001) peak | $\Delta\theta_{50}$ (deg.) | Ra (nm) |
|---|---|---|---|---|
| Ex. 7 | 2 | 10298 | 5.03 | 0.40 |
| | 4 | 10681 | 5.01 | 0.43 |
| | 6 | 15195 | 4.57 | 0.47 |
| | 8 | 14895 | 4.63 | 0.49 |
| | 10 | 17484 | 4.44 | 0.52 |
| | 15 | 19234 | 4.36 | 0.68 |
| | 20 | 16324 | 4.77 | 0.75 |
| C. Ex. 1 | 0 | 11412 | 7.47 | 0.71 |

Figure 5A:
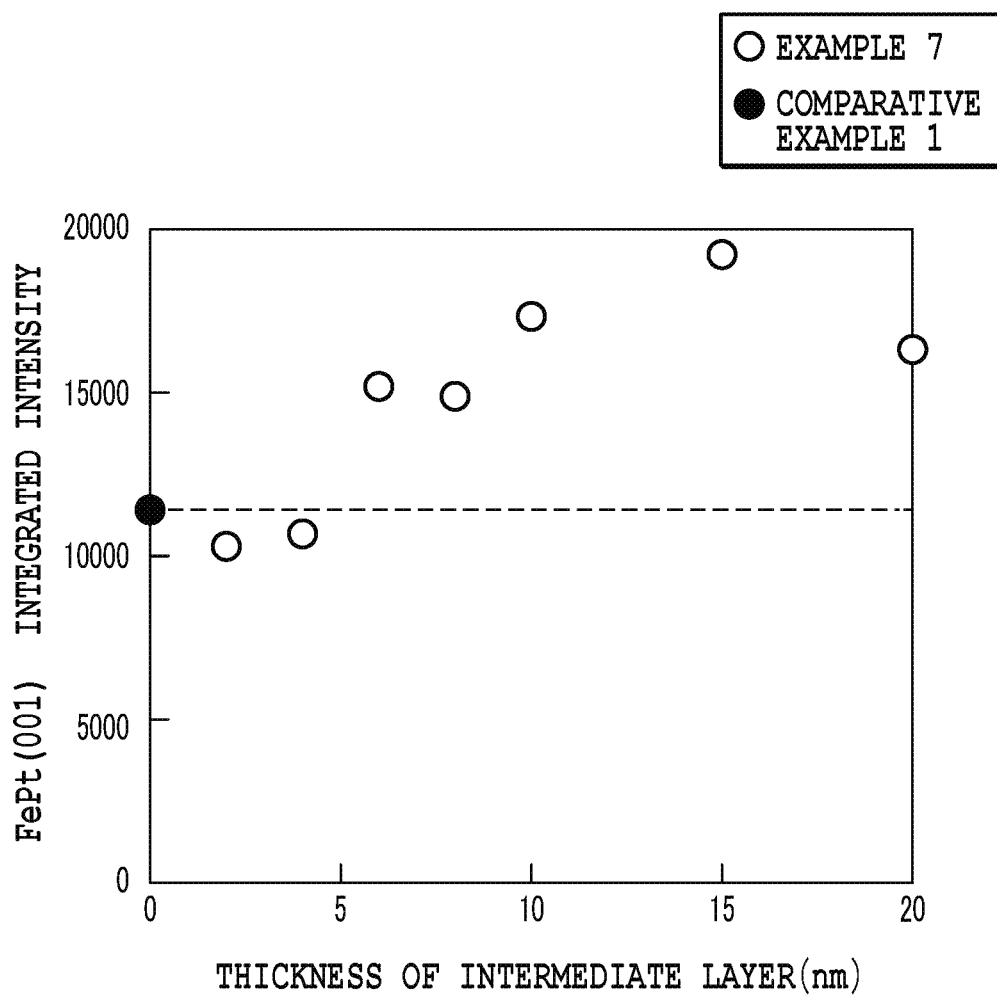
FIG. 5A is a graphical representation showing the relationship between the thickness of the Pt intermediate layer and the integrated intensity of the (001) FePt peak of the magnetic recording layer, of the magnetic recording media of Example 7 and Comparative Example 1.
Figure 5B:
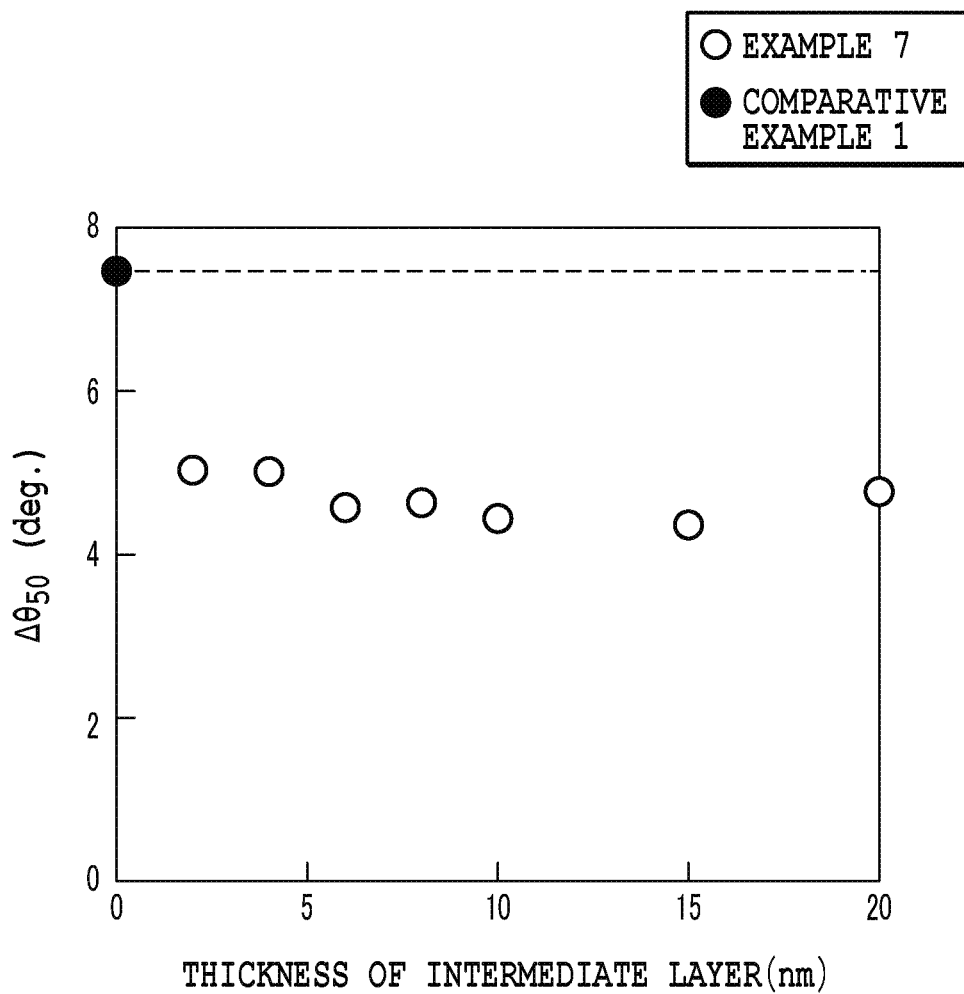
FIG. 5B is a graphical representation showing the relationship between the thickness of the Pt intermediate layer and the crystal axis orientation dispersion $\Delta\theta_{50}$ of the magnetic recording layer, of the magnetic recording media of Example 7 and Comparative Example 1.
Figure 5C:
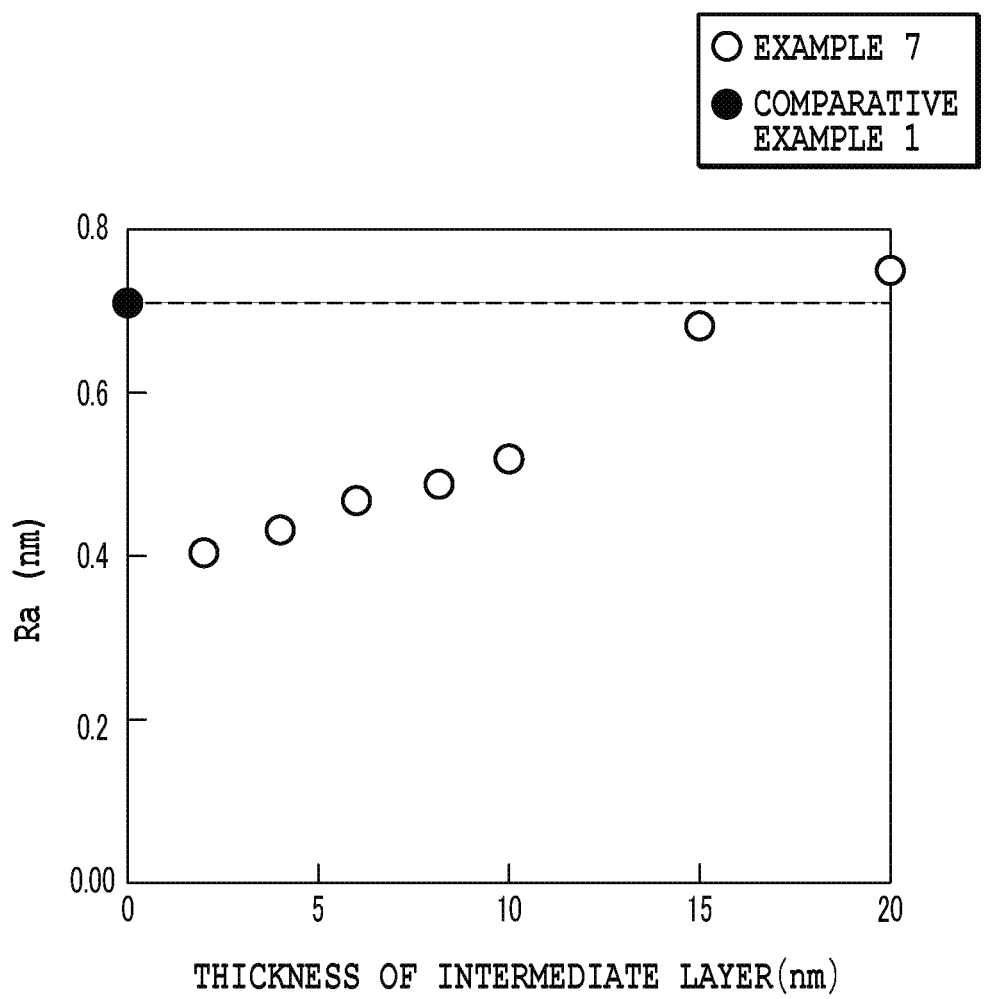
FIG. 5C is a graphical representation showing the relationship between the thickness of the Pt intermediate layer and the arithmetic average roughness Ra of the surface of the magnetic recording medium, of the magnetic recording media of Example 7 and Comparative Example 1.

In regard to the magnetic recording media of Example 7 and Comparative Example 1, the relationship between the thickness of the Pt intermediate layer 20 and the integrated intensity of the FePt (001) peak of the magnetic recording layer 40 is shown in FIG. 5A, the relationship between the thickness of the Pt intermediate layer 20 and the crystal axis orientation dispersion $\Delta\theta_{50}$ of the magnetic recording layer 40 is shown in FIG. 5B, and the relationship between the thickness of the Pt intermediate layer 20 and the arithmetic average roughness Ra of the magnetic recording layer 40 is shown in FIG. 5C. In accordance with Table 6 and FIG. 5A, it is understood that the thickness of the Pt intermediate layer 20 is preferably 5 nm or more, especially 6 nm or more, in order to increase the integrated intensity of the FePt (001) peak of the magnetic recording layer 40. On the other hand, in accordance with Table 6 and FIG. 5B, it is understood that disposition of the Pt intermediate layer 20 is effective in decreasing the crystal axis orientation dispersion of the FePt alloy in the magnetic recording layer 40. Further, in accordance with Table 6 and FIG. 5C, it is understood that disposition of the Pt intermediate layer 20 is effective in decreasing the arithmetic average roughness Ra of the surface of the magnetic recording medium, but the arithmetic average roughness Ra increases with increase in the thickness of the Pt intermediate layer 20. It is understood that the thickness of the Pt intermediate layer 20 is preferably about 17 nm or less, especially 15 nm or less, in order to decrease the arithmetic average roughness Ra. In view of the above, it has become apparent that the thickness of the Pt intermediate layer 20 of from about 5 nm to about 17 nm, especially from 6 nm to 15 nm, makes it possible to form the magnetic recording layer 40 having superior crystallinity, superior crystal axis orientation and superior smoothness, and thereby enhancing the expectation that the magnetic recording medium having superior magnetic properties will be obtained.

Example 8

A chemically strengthened glass substrate having a flat surface (N-10 glass substrate manufactured by HOYA CORPORATION) was washed to prepare substrate 10. The washed substrate 10 was brought into an inline-type sputtering device, type of which was different from that of the device used in Experimental Example A. Then, a Ta adhesive layer having a thickness of 5 nm was formed by a DC magnetron sputtering method using a pure Ta target in Ar gas at a pressure of 0.18 Pa. The substrate temperature was room temperature (25° C.) when forming the Ta adhesive layer. The sputtering power was 200 W when forming the Ta adhesive layer.

Next, Pt intermediate layer 20 having a thickness of 10 nm was formed by an RF magnetron sputtering method using a pure Pt target in Ar gas at a pressure of 0.44 Pa. The substrate temperature was room temperature (25° C.) when forming the Pt intermediate layer 20. The sputtering power was 300 W when forming the Pt intermediate layer 20.

Next, ZnO first seed layer 31 having a thickness of 10 nm was formed by an RF magnetron sputtering method using an MgO target in Ar gas at a pressure of 0.2 Pa. The substrate temperature was room temperature (25° C.) when forming the ZnO first seed layer 31. The sputtering power was 500 W when forming the ZnO first seed layer 31.

Next, MgO second seed layer 32 having a thickness of 10 nm was formed by an RF magnetron sputtering method using an MgO target in Ar gas at a pressure of 0.18 Pa. The substrate temperature was set to 450° C. when forming the MgO second seed layer 32. The sputtering power was 500 W when forming the MgO second seed layer 32.

Next, FePt magnetic recording layer 40 having a thickness of 10 nm was formed onto the MgO second seed layer 32 by an RF sputtering method using an FePt target in Ar gas at a pressure of 0.18 Pa, to obtain a magnetic recording medium. The substrate temperature was set to 350° C. when forming the FePt magnetic recording layer 40. The sputtering power was 300 W when forming the FePt magnetic recording layer 40.

Figure 6A:
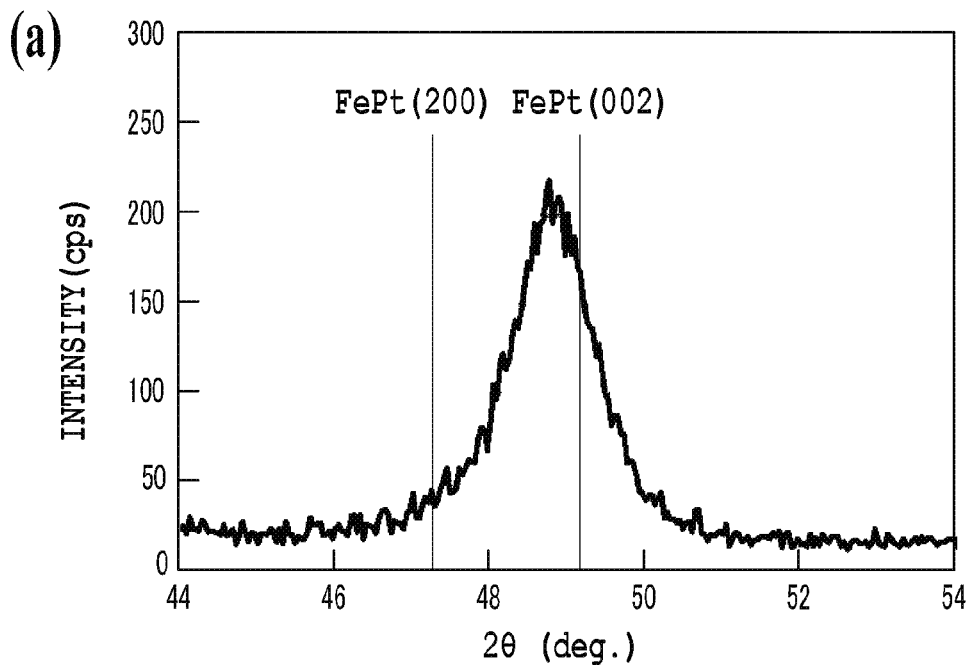
FIG. 6A shows diagrams for explaining structural analysis of the magnetic recording medium of Example 8, wherein diagram (a) shows a part of the XRD spectrum, and diagram (b) shows a result of peak separation.
Figure 6A:
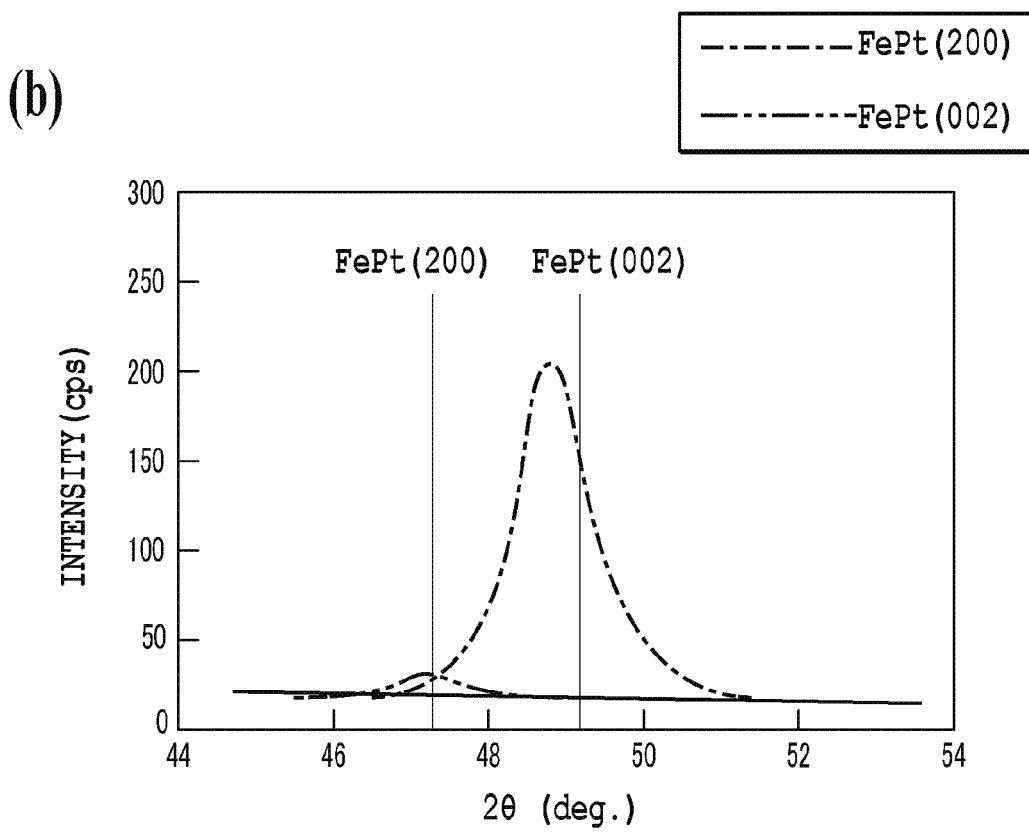

The integrated intensity of the FePt (002) peak of the magnetic recording layer 40 was measured by an X-ray diffraction (XRD) of the obtained magnetic recording medium. The FePt (002) peak was caused by the structure in which FePt alloy was ordered in the in-plane direction. The phrase "structure ordered in the in-plane direction" means a structure in which the layer of magnetic element Fe and the layer of noble metal Pt are perpendicular to the surface of the magnetic recording medium, and the axis of easy magnetization is parallel to the to the surface of the magnetic recording medium. Peak separation of the peaks around 2θ of 47° to 50° in the XRD spectrum was carried out using the position of FePt (200) peak (2θ=47.429°) and the position of FePt (002) peak (2θ=48.183° to 49.183°). The position of the FePt (200) peak relies on Card No. 03-065-9121 of International Center for Diffraction Data (ICDD). The variation in the lattice constant due to strain was taken into consideration, for the position of the FePt (002) peak. FIG. 6A(a) shows the XRD spectrum, and FIG. 6A(b) shows the result of the peak separation. Further, a coercive force in the in-plane direction Hc_in was measured with a vibrating sample magnetometer (VSM). The integrated intensity of the FePt (200) peak and the coercive force in the in-plane direction Hc_in of the obtained magnetic recording medium were shown in Table 7.

Comparative Example 6

A chemically strengthened glass substrate having a flat surface (N-10 glass substrate manufactured by HOYA CORPORATION) was washed to prepare substrate 10. The washed substrate 10 was brought into an inline-type sputtering device, type of which was the same as the device used in Example 8. Then, a Ta adhesive layer having a thickness of 5 nm was formed by a DC magnetron sputtering method using a pure Ta target in Ar gas at a pressure of 0.2 Pa. The substrate temperature was room temperature (25° C.) when forming the Ta adhesive layer. The sputtering power was 200 W when forming the Ta adhesive layer.

Next, MgO film having a thickness of 1 nm was formed by an RF magnetron sputtering method using an MgO target in Ar gas at a pressure of 0.2 Pa. The substrate temperature was room temperature (25° C.) when forming the MgO film. The sputtering power was 200 W when forming the MgO film. Subsequently, a Cr film having a thickness of 20 nm was formed by an DC magnetron sputtering method using a pure Cr target in Ar gas at a pressure of 0.2 Pa, to obtain intermediate layer 20 consisting of the MgO film and the Cr film. The substrate temperature was room temperature (25° C.) when forming the Cr film. The sputtering power was 200 W when forming the Cr film.

Figure 6B:
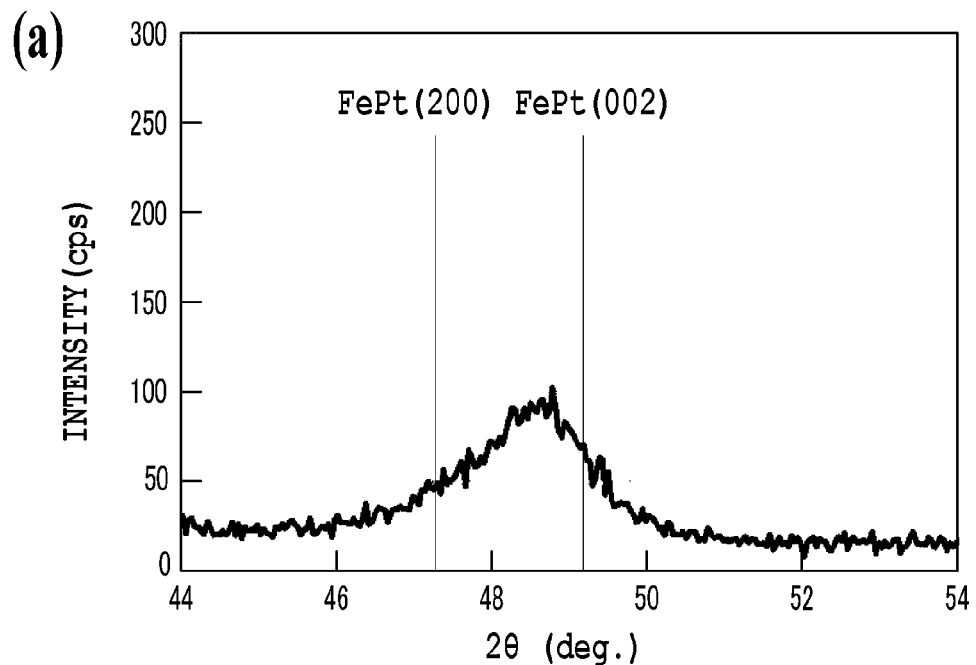
FIG. 6B shows diagrams for explaining structural analysis of the magnetic recording medium of Comparative Example 6, wherein diagram (a) shows a part of the XRD spectrum, and diagram (b) shows a result of peak separation.
Figure 6B:
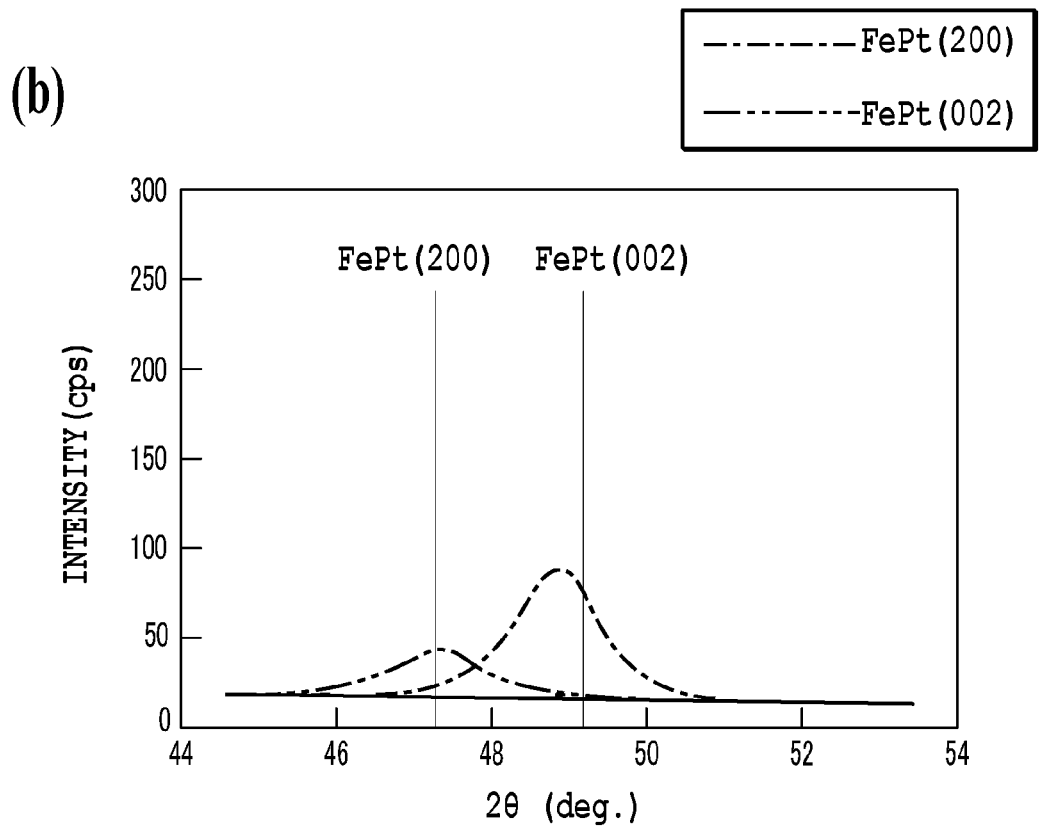

Next, the MgO second seed layer 32 and the FePt magnetic recording layer 40 were formed in accordance with the same procedure as Example 7, to obtain a magnetic recording medium. FIG. 6B (a) shows the XRD spectrum, and FIG. 6B (b) shows the result of the peak separation. The integrated intensity of the FePt (200) peak and the coercive force in the in-plane direction Hc_in of the obtained magnetic recording medium were shown in Table 7.

TABLE 7

Constitutions and properties of the magnetic recording media of Example 8 and Comparative Example 6

| | Intermediate layer | First Seed layer | Hc_in (kOe)*[1] | Integrated Intensity of Fe (200) peak |
|---|---|---|---|---|
| Ex. 8 | Pt | ZnO | 0.3 | 712 |

TABLE 7-continued

Constitutions and properties of the magnetic recording
media of Example 8 and Comparative Example 6

| | Intermediate layer | First Seed layer | Hc_in (kOe)*1 | Integrated Intensity of Fe (200) peak |
|---|---|---|---|---|
| C. Ex. 6 | MgO, Cr*2 | absence | 3.6 | 1644 |

*1 kOe = 79.6 A/mm
*2 a laminated structure of an MgO film and a Cr film formed on the MgO film.

As shown in Table 7, the magnetic recording medium of Comparative Example 6 not having the first seed layer 31 exhibited a larger integrated intensity of FePt (200) peak than that of the magnetic recording medium of Example 8 comprising the ZnO first seed layer 31. This means that a great number of undesired in-plane ordered structures are present in Comparative Example 6. As a result thereof, the magnetic recording medium of Comparative Example 6 exhibited a coercive force in the in-plane direction Hc_in larger than that of the magnetic recording medium of Example 8. Based on these results, it is understood that the ZnO first seed layer 31 is important in ordering the FePt alloy in the magnetic recording layer in a direction perpendicular to the surface.

Example 9

This example relates to a magnetic recording medium according to the present invention, comprising both of the ZnO first seed layer 31 and the MgO second seed layer 32, and comprising the magnetic recording layer 40 having a granular structure.

The layers up to the MgO second seed layer 32 were formed in accordance with the same procedure as Example 8. Then, the FePt—C magnetic recording layer 40 having a thickness of 4 nm was formed onto the MgO second seed layer 32 by an RF sputtering method using an FePt target and a C target in Ar gas at a pressure of 0.34 Pa, to obtain a magnetic recording medium. The substrate temperature was 450° C. when forming the FePt—C magnetic recording layer 40. Besides, an RF power of 137 W was applied to the FePt target, and an RF power of 500 W was applied to the C target. The obtained FePt—C magnetic recording layer 40 had a granular structure comprising FePt magnetic crystal grains and 25% by volume of a C non-magnetic grain boundary.

Figure 7A:
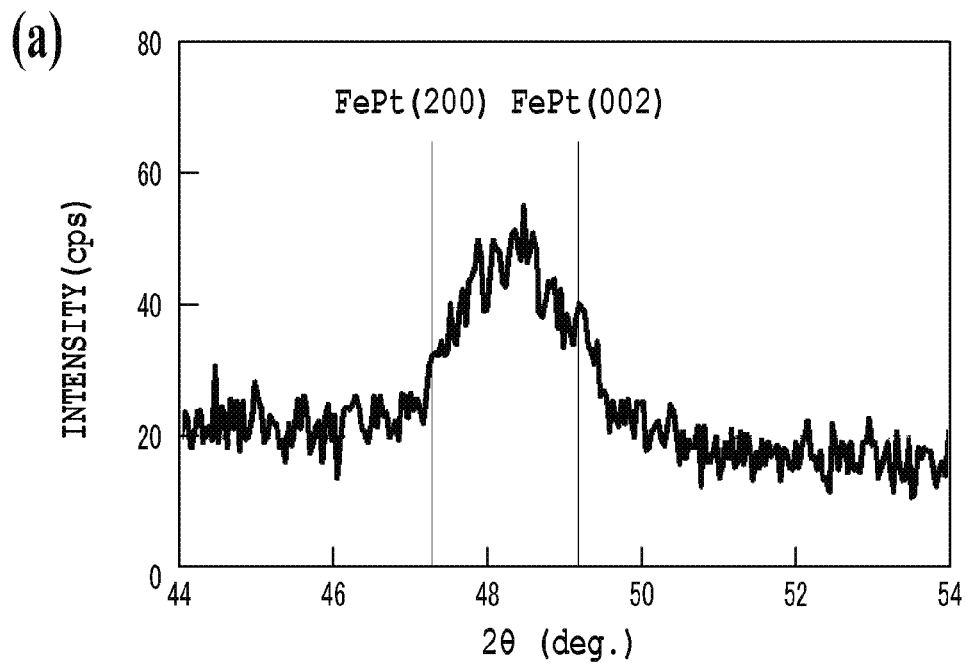
FIG. 7A shows diagrams for explaining structural analysis of the magnetic recording medium of Example 9, wherein diagram (a) shows a part of the XRD spectrum, and diagram (b) shows a result of peak separation.
Figure 7A:
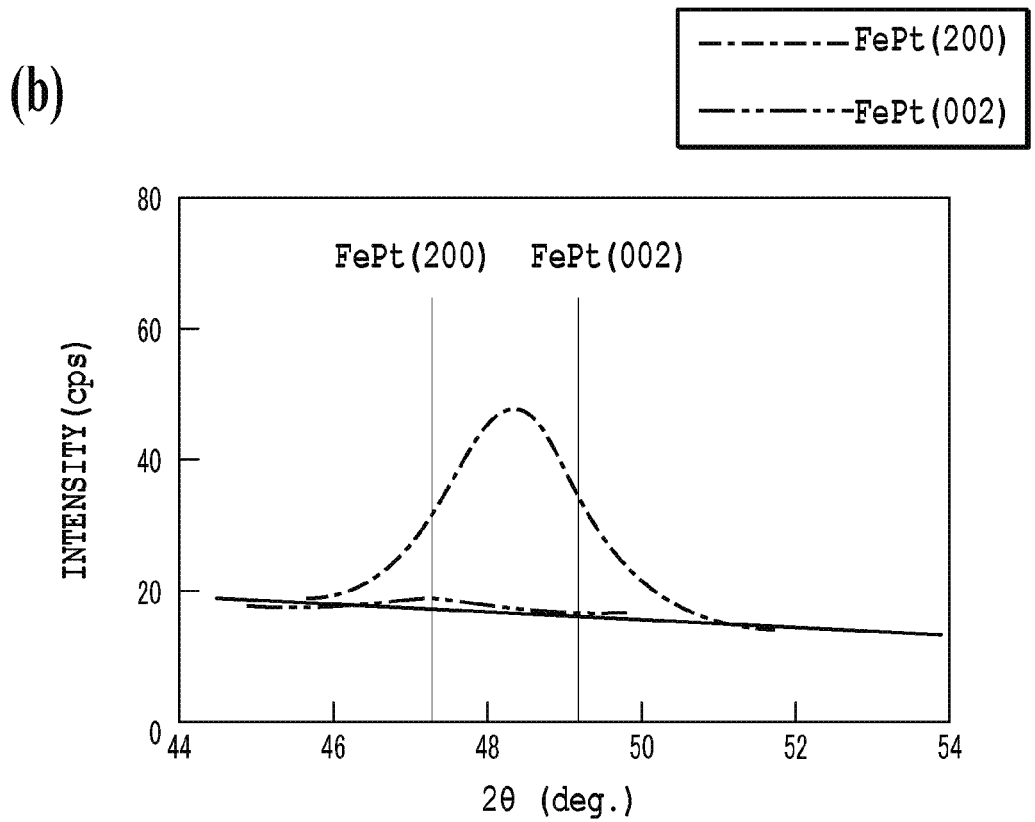

FIG. 7A(a) shows the XRD spectrum, and FIG. 7A(b) shows the result of the peak separation. The integrated intensity of the FePt (200) peak and the coercive force in the in-plane direction Hc_in of the obtained magnetic recording medium were shown in Table 8.

Comparative Example 7

This example relates to a magnetic recording medium comprising the magnetic recording layer 40 having a granular structure, but not comprising the ZnO first seed layer 31.

The layers up to the MgO second seed layer 32 were formed in accordance with the same procedure as Comparative Example 6. Then, the FePt—C magnetic recording layer 40 having a thickness of 4 nm was formed onto the MgO second seed layer 32 by an RF sputtering method using an FePt target and a C target in Ar gas at a pressure of 0.34 Pa, to obtain a magnetic recording medium. The substrate temperature was 450° C. when forming the FePt—C magnetic recording layer 40. Besides, an RF power of 137 W was applied to the FePt target, and an RF power of 500 W was applied to the C target. The obtained FePt—C magnetic recording layer 40 had a granular structure comprising FePt magnetic crystal grains and 25% by volume of a C non-magnetic grain boundary.

Figure 7B:
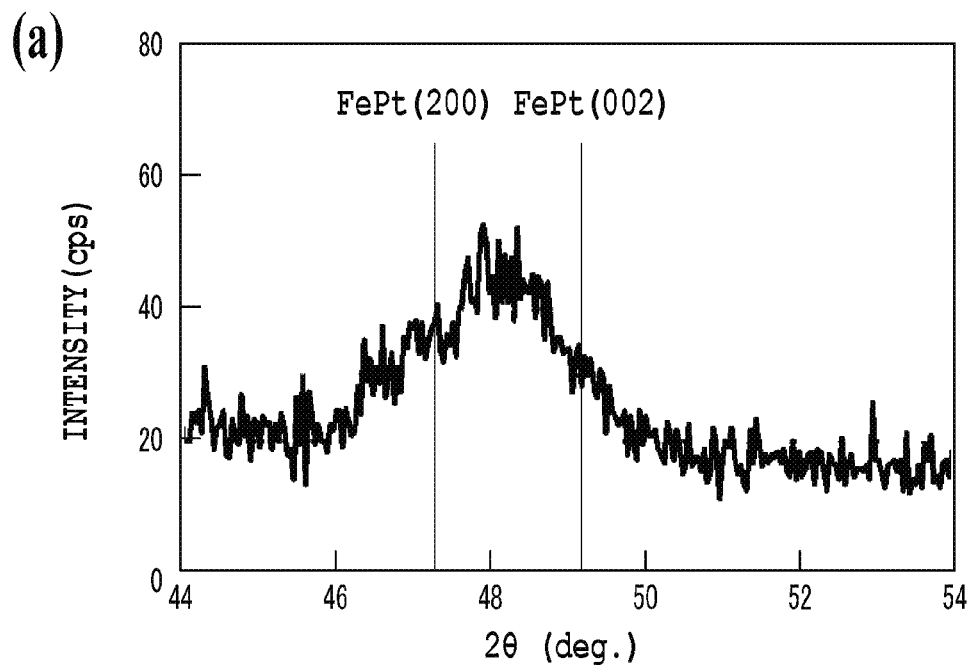
FIG. 7B shows diagrams for explaining structural analysis of the magnetic recording medium of Comparative Example 7, wherein diagram (a) shows a part of the XRD spectrum, and diagram (b) shows a result of peak separation.
Figure 7B:
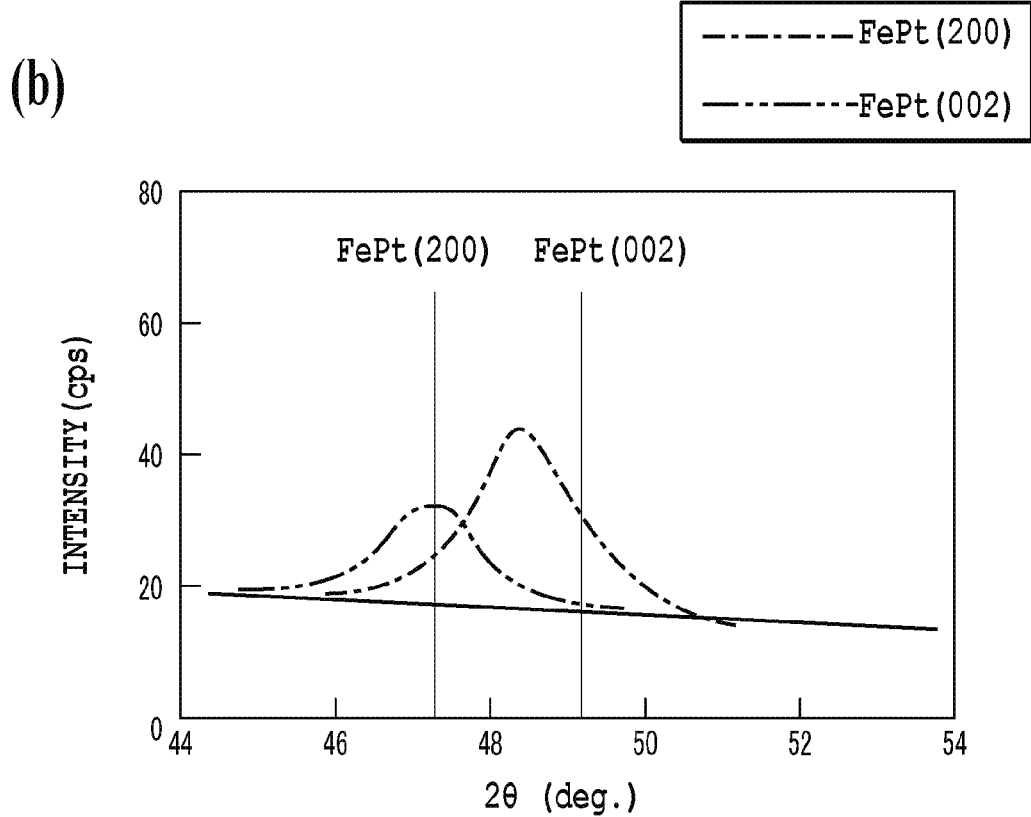

FIG. 7B(a) shows the XRD spectrum, and FIG. 7B(b) shows the result of the peak separation. The integrated intensity of the FePt (200) peak and the coercive force in the in-plane direction Hc_in of the obtained magnetic recording medium were shown in Table 8.

TABLE 8

Constitution and properties of the magnetic recording
media of Example 8 and Comparative Example 6

| | Intermediate layer | First Seed layer | Hc_in (kOe)*1 | Integrated Intensity of Fe (200) peak |
|---|---|---|---|---|
| Ex. 9 | Pt | ZnO | 0.4 | 6 |
| C. Ex. 7 | MgO, Cr *2 | absent | 1.3 | 1056 |

*1 kOe = 79.6 A/mm
*2 a laminated structure of an MgO film and a Cr film formed on the MgO film.

As shown in Table 8, the magnetic recording medium of Comparative Example 7 not having the first seed layer 31 exhibited a remarkably larger integrated intensity of FePt (200) peak than that of the magnetic recording medium of Example 9 comprising the ZnO first seed layer 31. This means that a great number of undesired in-plane ordered structures are present in Comparative Example 7. As a result thereof, the magnetic recording medium of Comparative Example 7 exhibited a coercive force in the in-plane direction Hc_in larger than that of the magnetic recording medium of Example 9. Based on these facts, it is understood that the ZnO first seed layer 31 is important in ordering the FePt alloy in the magnetic recording layer in a direction perpendicular to the surface, even when using the magnetic recording layer 40 having a granular structure.

REFERENCE SIGNS LIST

10 Non-magnetic substrate
20 Intermediate layer
31 First seed layer
32 Second seed layer
40 Magnetic recording layer

The invention claimed is:

1. A magnetic recording medium comprising a substrate, a first seed layer consisting of ZnO, a second seed layer comprising MgO, and a magnetic recording layer comprising an ordered alloy, in this order.

2. The magnetic recording medium according to claim 1, further comprising an intermediate layer having a face-centered cubic lattice structure or a hexagonal closest packing structure, between the substrate and the first seed layer.

3. The magnetic recording medium according to claim 1, wherein the ordered alloy is an $L1_0$ type ordered alloy comprising at least one element selected from the group consisting of Fe and Co, and at least one element selected from the group consisting of Pt, Pd, Au, and Ir.

4. The magnetic recording medium according to claim 3, wherein the ordered alloy further comprises at least one element selected from the group consisting of Ni, Mn, Cu, Ru, Ag, Au, and Cr.

5. The magnetic recording medium according to claim 3, wherein the ordered alloy is an $L1_0$ type ordered alloy selected from the group consisting of FePt, CoPt, FePd, and CoPd.

6. The magnetic recording medium according to claim 1, wherein the magnetic recording layer has a granular structure comprising magnetic crystal grains and a non-magnetic grain boundary which surrounds the magnetic crystal grains, and the magnetic crystal grains comprise the ordered alloy.

7. The magnetic recording medium according to claim 6, wherein the non-magnetic grain boundary comprises a non-magnetic material selected from the group consisting of carbon, an oxide, and a nitride.

* * * * *